United States Patent
Itou et al.

(10) Patent No.: US 7,621,454 B2
(45) Date of Patent: Nov. 24, 2009

(54) IMAGING DEVICE WITH A TWO-DIMENSIONAL PHOTODETECTOR

(75) Inventors: Kunihiko Itou, Chiryu (JP); Hisashi Shigekusa, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 89 days.

(21) Appl. No.: 11/546,276

(22) Filed: Oct. 12, 2006

(65) Prior Publication Data

US 2007/0084927 A1 Apr. 19, 2007

(30) Foreign Application Priority Data

Oct. 13, 2005 (JP) .............................. 2005-298961
Apr. 12, 2006 (JP) .............................. 2006-109809

(51) Int. Cl.
*G06K 7/10* (2006.01)

(52) U.S. Cl. .............................. 235/462.11; 235/462.24

(58) Field of Classification Search ............ 235/462.12, 235/462.41, 462.23, 462.11, 454, 462.24, 235/462.32

See application file for complete search history.

(56) References Cited

U.S. PATENT DOCUMENTS

| 5,634,163 A | 5/1997 | Kamata |
| 6,634,554 B1 * | 10/2003 | Merchant ................ 235/462.23 |
| 7,222,790 B2 * | 5/2007 | Kitazumi ..................... 235/454 |
| 7,267,276 B2 * | 9/2007 | Ito et al. ..................... 235/454 |
| 2002/0122124 A1 * | 9/2002 | Suda .......................... 348/263 |

FOREIGN PATENT DOCUMENTS

| JP | UM-H05-036568 | 5/1993 |
| JP | A-7-078220 | 3/1995 |
| JP | A-H09-005817 | 1/1997 |
| JP | H10-341361 | 12/1998 |
| JP | A-2002-024754 | 1/2002 |
| JP | 2002-117372 | 4/2002 |
| JP | A-2002-125096 | 4/2002 |
| JP | A-2003-326566 | 11/2003 |
| JP | A-2004-279684 | 10/2004 |
| JP | A-2005-266907 | 9/2005 |

OTHER PUBLICATIONS

Office Action dated Apr. 4, 2008 in corresponding Chinese Patent Application No. 2006101318252 (and English translation).
Office Action dated Feb. 13, 2009 in corresponding Japanese Patent Application No. 2006-109809 (and English translation).

* cited by examiner

*Primary Examiner*—Kumiko C Koyama
(74) *Attorney, Agent, or Firm*—Posz Law Group, PLC

(57) ABSTRACT

In an imaging device for imaging a target, a photodetector with a two-dimensional light sensitive pixel area is provided. The two-dimensional light sensitive pixel area is divided into a plurality of split pixel areas. An imaging optics defines a plurality of segments of an FOV (field of view). The plurality of segments of the FOV respectively correspond to the plurality of split pixel areas of the photodetector. The imaging optics aligns, in a predetermined direction, the plurality of segments of the FOV to form a predetermined-direction oriented FOV so that the target is at least partially contained in the predetermined-direction oriented FOV.

22 Claims, 21 Drawing Sheets

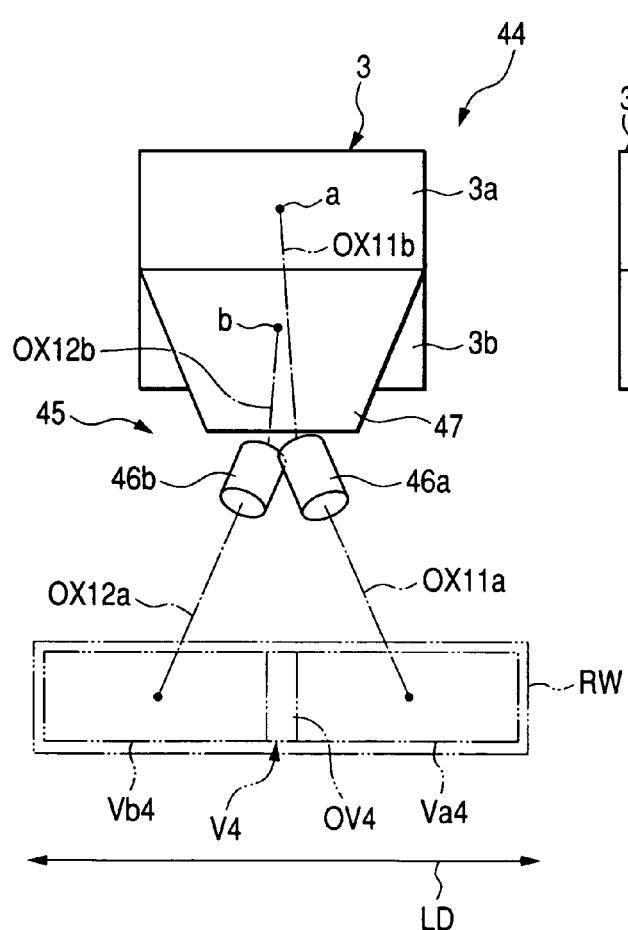
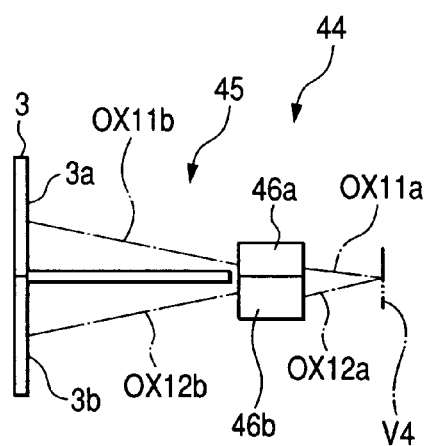
FIG. 14A
FIG. 14B

IMAGING DEVICE WITH A TWO-DIMENSIONAL PHOTODETECTOR

CROSS REFERENCE TO RELATED APPLICATION

This application is based on Japanese Patent Applications 2005-298961 and 2006-109809 respectively filed on Oct. 13, 2005 and Apr. 12, 2006. This application claims the benefit of priority from the Japanese Patent Applications, so that the descriptions of which are all incorporated herein by reference.

BACKGROUND OF THE INVENTION

1. Field of the Invention

The present invention relates to imaging devices, such as code readers, digital cameras, or the like, having a photodetector with a two-dimensional light sensitive pixel area.

2. Description of the Related Art

As imaging devices with a two-dimensional photodetector, such as a CCD (Charge-Coupled device) area sensor, optical information readers have been used. The optical information readers aim at reading optically readable information, such as a barcode, a two-dimensional code, or other types of information.

Specifically, the optical information readers are operative to:

pick up, through their reading windows, an image of a target containing a barcode by the two-dimensional photodetector;

binarize the picked-up image to obtain code data of the barcode; and decode the code data.

Such two-dimensional photodetectors normally have a two-dimensional light-sensitive pixel area composed of CCDs (pixels) vertically and horizontally arranged in matrix. The light-sensitive pixel area of each two-dimensional photodetector normally has a 3:4 CCD aspect ratio (vertical to horizontal ratio).

Let us consider a case where a user wants to read, with the use of an optical information reader, a target barcode storing therein a comparatively large amount of data and having a relatively large length (width) across its bars and spaces compared with other normal barcodes.

In this case, when the user locates the optical information reader such that the reading window closely faces the target barcode as is the case of reading a normal barcode, the whole of the target barcode may extend far beyond the field of view (FOV) of the two-dimensional photodetector.

In order to avoid the extension of the target barcode beyond the FOV, even if the user moves the optical information reader to separate the reading window from the target barcode such that the whole of the target barcode contains within the FOV, the image of the target barcode would be picked up by the photodetector with its size being reduced. This may cause the resolution of the optical information reader to deteriorate, and therefore the reading performance of the optical information reader may deteriorate.

For overcoming these problems set forth above, Japanese Unexamined Patent Publication No. 2002-117372 discloses barcode generating systems configured to generate a barcode whose size can be contained within the FOV of a barcode reader. The disclosed barcode generating systems however cannot generate barcodes each of which stores therein a comparatively large amount of data and has a relatively large length (width) across its bars and spaces. Specifically, it is difficult to provide ultimate solution to these problems.

Similarly, as imaging devices with a two-dimensional photodetector, digital cameras have been used for taking images of landscapes and/or people. Some of the digital cameras have a function of taking panoramic images whose width (horizontal length) is longer than its height (vertical length). For example, Japanese Unexamined Patent Publication No. H10-341361 discloses digital cameras configured to:

generate image data of a target with the size corresponding to the light sensitive pixel area of the two-dimensional photodetector; and delete part of the image data corresponding to one-quarter region of either side of the light sensitive pixel area in its height direction (vertical direction) to generate panoramic image data whose aspect ratio is 3:8.

When taking a target barcode storing therein a comparatively large amount of data and having a relatively large length across its bars and spaces compared with other normal barcodes, the disclosed digital cameras however cannot effectively use the light-sensitive pixel area of the two-dimensional photodetector, which may cause the resolution of the digital cameras to deteriorate.

SUMMARY OF THE INVENTION

In view of the background, an object of at least one aspect of the present invention is to provide imaging devices with a two-dimensional photodetector, which are capable of obtaining image data of targets while keeping its resolution high; these targets include lengthy targets, such as horizontally oriented items of optically readable information and panoramic views.

According to one aspect of the present invention, there is provided an imaging device for imaging a target. The imaging device includes a photodetector with a two-dimensional light sensitive pixel area, the two-dimensional light sensitive pixel area being divided into a plurality of split pixel areas. The imaging device also includes an imaging optics configured to define a plurality of segments of an FOV (field of view), the plurality of segments of the FOV respectively corresponding to the plurality of split pixel areas of the photodetector. The imaging optics is also configured to align, in a predetermined direction, the plurality of segments of the FOV to form a predetermined-direction oriented FOV so that the target is at least partially contained in the predetermined-direction oriented FOV.

BRIEF DESCRIPTION OF THE DRAWINGS

Other objects and aspects of the invention will become apparent from the following description of embodiments with reference to the accompanying drawings in which:

FIG. 14A is a view schematically illustrating part of a reading mechanism when it is viewed from the opposite side of a pixel area of a two-dimensional photodetector according to a sixth embodiment of the present invention;

FIG. 14B is a schematic side view of the part of the reading mechanism illustrated in FIG. 14A;

DETAILED DESCRIPTION OF EMBODIMENTS OF THE INVENTION

Embodiments of the present invention will be described hereinafter with reference to the accompanying drawings. In the embodiments, the present invention is applied to an optical information reader as an example of imaging devices.

First Embodiment

Referring to FIGS. 1 to 5, an optical information reader 1 according to a first embodiment of the present invention is provided with, for example, a substantially rectangular-parallelepiped case (housing) that allows a user to easily grip it in one hand.

Figure 1:
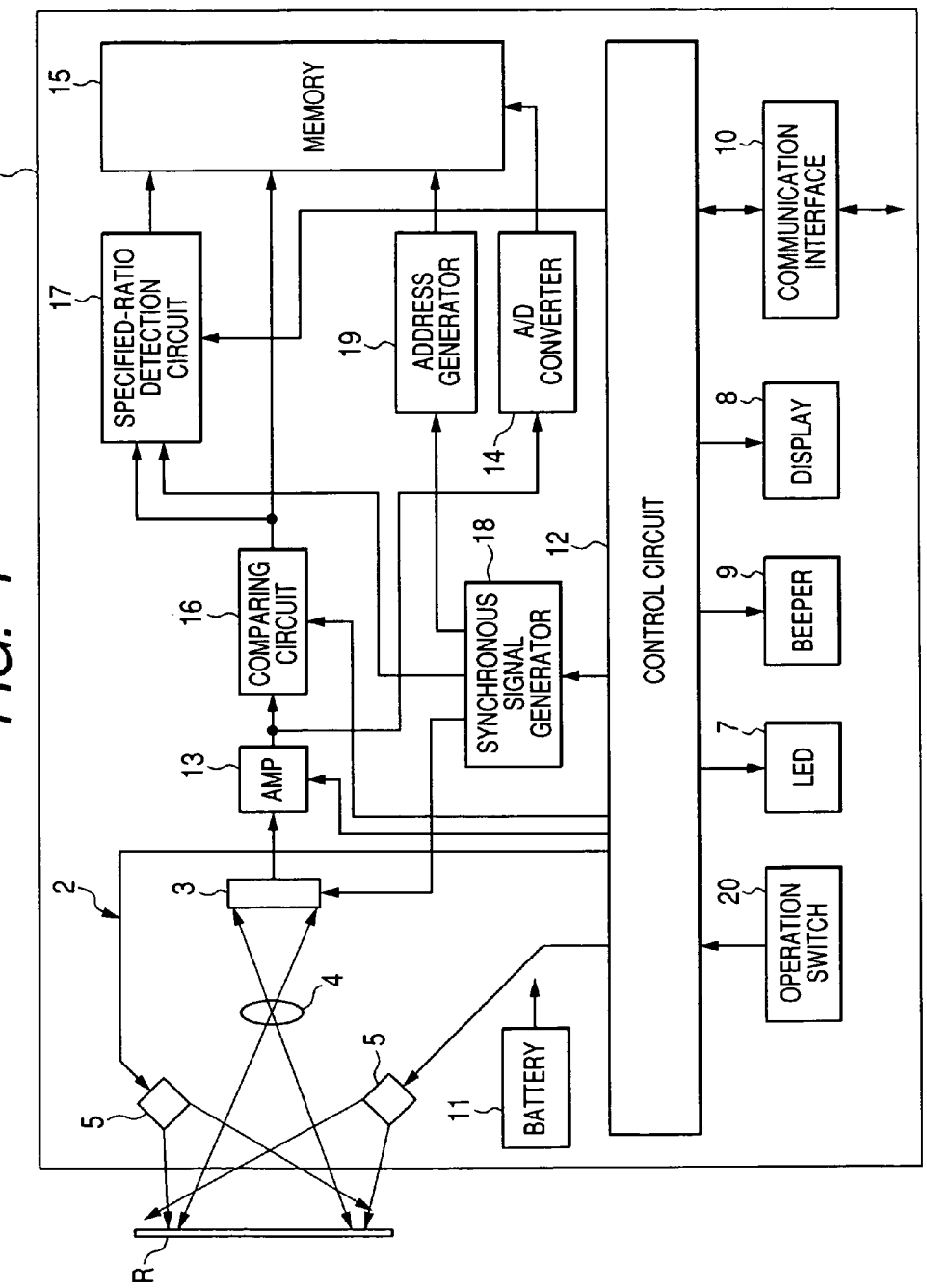
FIG. 1 is a block diagram schematically illustrating an example of the electric structure of an optical information reader according to a first embodiment of the present invention.
Figure 2A:
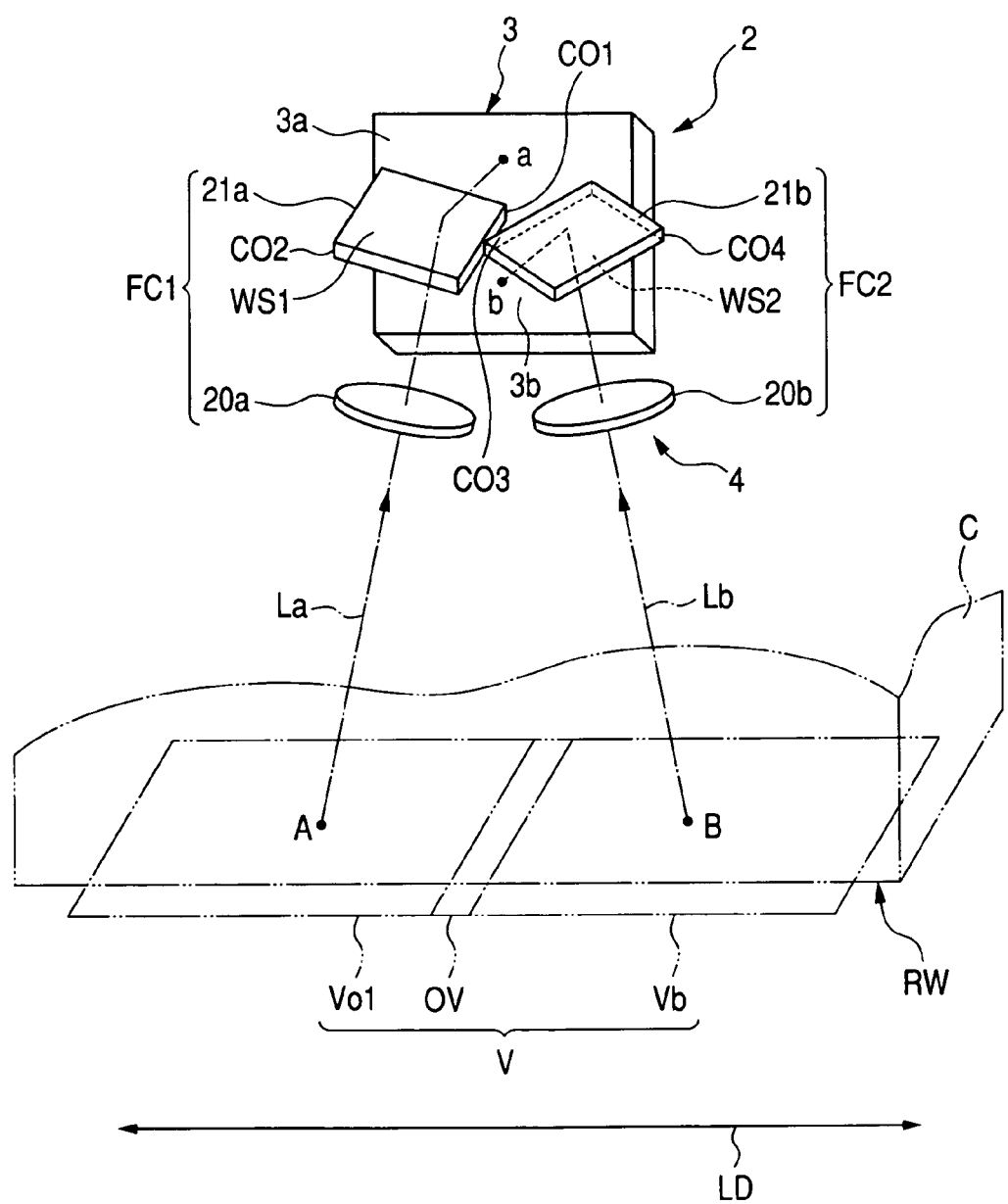
FIG. 2A is an enlarged perspective view schematically illustrating an example of the structure of part of a reading mechanism illustrated in FIG. 1.
Figure 2B:
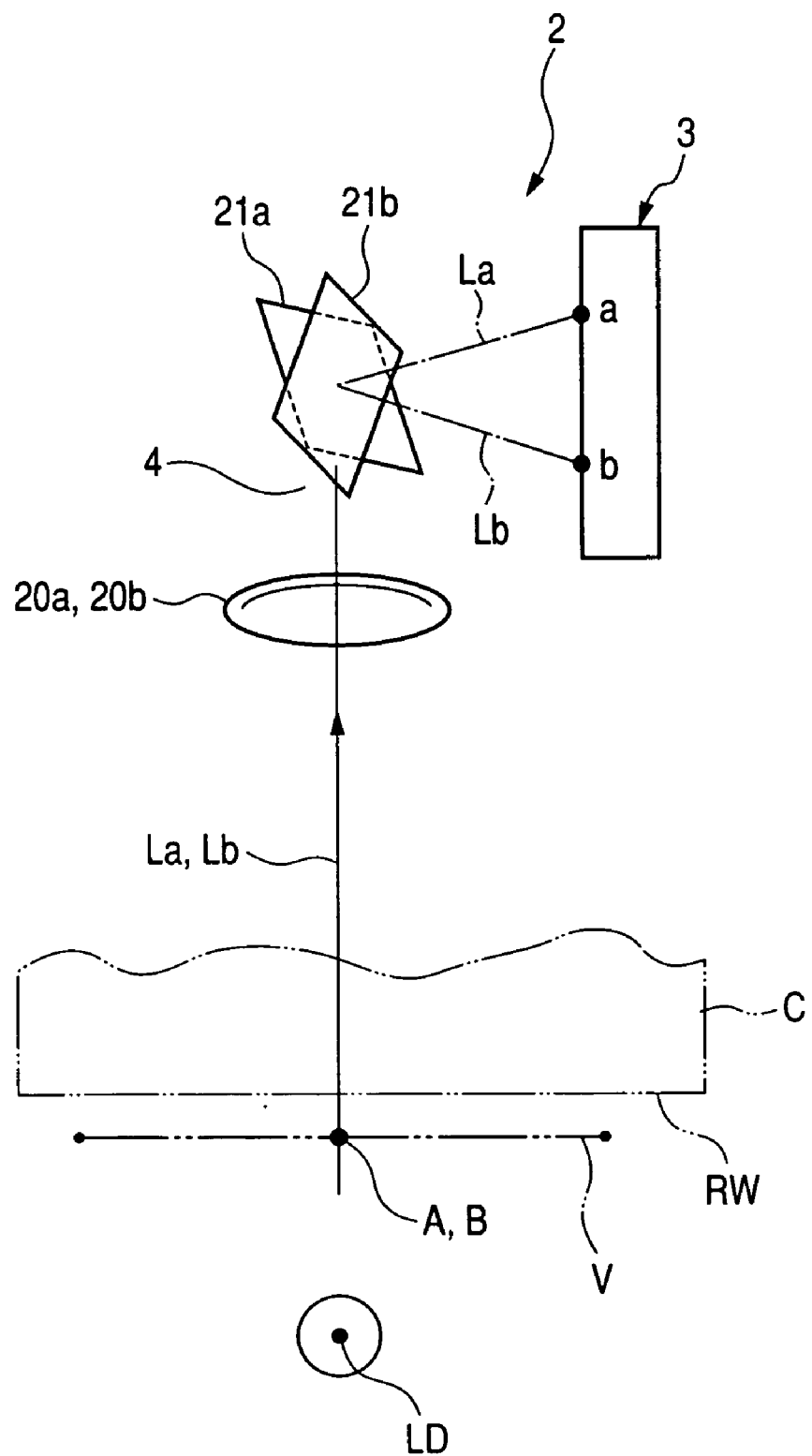
FIG. 2B is a schematic side view of the part of the reading mechanism according to the first embodiment.
Figure 3A:
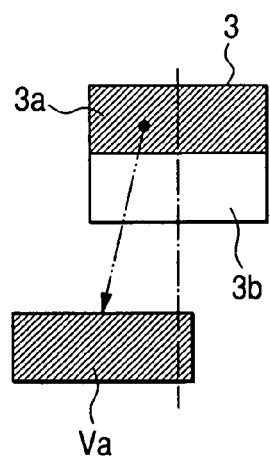
FIG. 3A is a view schematically illustrating how to pick up image data contained in a first FOV segment by a top split pixel area of a two-dimensional photodetector of the reading mechanism according to the first embodiment.
Figure 3B:
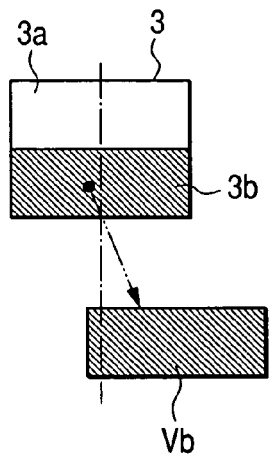
FIG. 3B is a view schematically illustrating how to pick up image data contained in a second FOV segment by a bottom split pixel area of the two-dimensional photodetector of the reading mechanism according to the first embodiment.
Figure 3C:
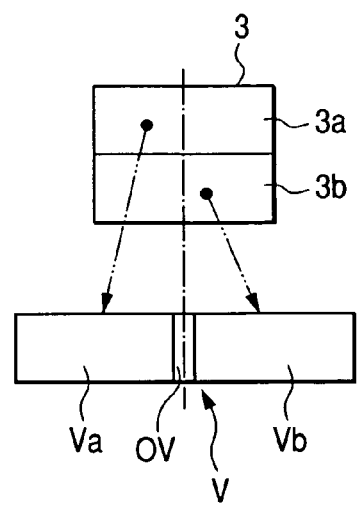
FIG. 3C is a view schematically illustrating how to pick up image data contained in a horizontally-oriented FOV by the top and bottom split pixel areas of the two-dimensional photodetector of the reading mechanism according to the first embodiment.
Figure 4A:
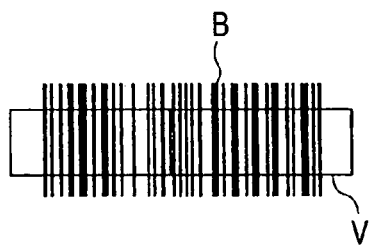
FIG. 4A is a view schematically illustrating a positional relationship between the horizontally-oriented FOV and a barcode according to the first embodiment.
Figure 4B:
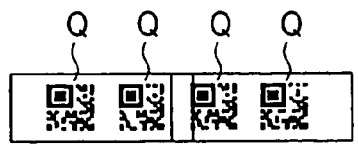
FIG. 4B is a view schematically illustrating a positional relationship between the horizontally-oriented FOV and a plurality of two-dimensional codes according to the first embodiment.

One end portion of the case in its longitudinal direction has a substantially rectangular-shaped lateral wall orthogonal to the longitudinal direction and formed wholly with a substantially rectangular-shaped reading window having translucency. Part of the case is schematically illustrated in FIGS. 2A and 2B as reference character "C", and the reading window is also schematically illustrated in FIGS. 2A and 2B as reference character "RW".

The optical information reader 1 is provided with a reading mechanism (optical reading mechanism) 2 operative to read optical information and disposed in the one end portion of the case. In the first embodiment, the one end portion of the case will be referred to as "head portion".

The reading mechanism 2 includes a two-dimensional photodetector 3 consisting of, for example, a color CCD area sensor, an imaging optics 4, and a plurality of illuminating devices, such as light emitting diodes, 5.

The two-dimensional photodetector 3, referred to simply as "photodetector 3", is located at the center of the head portion of the case. The photodetector 3 has a light sensitive pixel area composed of pixels vertically and horizontally arranged in matrix (in height and width).

The photodetector 3 is arranged such that the horizontal direction of the pixel area is parallel to the longitudinal direction of the reading window RW, and that the vertical direction of the pixel area is orthogonal to the lateral direction of the reading window RW. For this reason, in the first embodiment, the longitudinal direction of the reading window RW will also be referred to as "horizontal direction", and the lateral direction of the reading window RW will also be referred to as "vertical direction".

The imaging optics 4 is operative to focus an image of a target R onto the light sensitive pixel area of the photodetector 3. The schematic configuration of the imaging optics 4 will be described in detail hereinafter.

Each of the light illuminating devices 5 is disposed around the imaging optics 4. Specifically, each of the light illuminating devices 5 is operative to irradiate illuminating light directed through the reading window to the target R.

The target R is, for example, a goods itself, a label attached on goods, or a page of catalog. These label and page of the catalog are pieces of paper or another media. On the surface of the target R, at least one optical information code is written in advance.

As at least one optical information code, a barcode B (see FIG. 4A), two-dimensional codes Q, such as QR codes® (see FIG. 4B), or at least one of other types of codes can be used.

In recent years, the target R has included the screen of a display, such as a liquid crystal display (LCD) in a computer terminal, such as a cellular phone or a PDA (Personal Digital Assistant). In this case, at least one optical information code, such as a barcode, a two-dimensional code Q, or at least one of other types of codes can be displayed on the screen of the display.

Specifically, when the optical information reader 1 is located such that its reading window is closely opposite to the target R on which an optical information code is written, the illuminating light emitted from each of the light illuminating devices 5 is irradiated through the reading window to the optical information code. Light reflected from the target R containing the optical information code is entered through the reading window into the imaging optics 4. The reflected light entered into the imaging optics 4 is imaged on the pixel area of the photodetector 3 by the imaging optics 4, so that image data in analog form corresponding to the target R is picked up by the photodetector 3.

Specifically, the charge in each pixel (each CCD) of the pixel area of the photodetector 3 is scanned horizontal-line by horizontal-line so that the image data in analog form corresponding to light intensity data (pixel data) of each pixel of the pixel area of the photodetector 3 is obtained.

Moreover, the optical information reader 1 is provided with a circuit board (not shown), operating switches 6 including a shutter switch, an LED 7, a liquid crystal display 8, a beeper 9, a communication interface 10, and a battery, such as a rechargeable battery 11.

The elements 6 to 8 are disposed to, for example, the outer surface portion of the case, and the elements 9 and 10 are installed beforehand in/on the circuit board.

The operating switches 6 are operative to allow a user to input various instructions to the reader 1.

The LED 7 is operative to visually indicate information to sent notice to a user, and the liquid crystal display 8 is operative to visually display an image based on the picked-up image data.

The beeper 9 is operative to emit a series of beeps to send notice to a user.

The optical information reader 1 is provided with a control unit 12, an amplifier 13, an analog to digital (A/D) converter 14, a memory 15, a comparing circuit 16, a specified-ratio detection circuit 17, a synchronous signal generator 18, and an address generator 19 installed beforehand in/on the circuit board. The electrical elements 13 to 19 are communicably coupled to the control unit 12.

The battery 11 serves as power supply for activating the above optical devices 3 and 5, and the electrical components 9 to 19.

The control unit 12 is composed of at least one microcomputer. The microcomputer consists of, for example, a CPU (Central Processing Unit), an internal memory unit including a ROM (Read Only Memory), a RAM (Random Access Memory), and the like, and peripherals.

The control unit 12 is electrically connected to the operating switches 6 such that the instructions entered from the operating switches 6 are input thereto. In addition, the control unit 12 is electrically connected to the two-dimensional photodetector 3 and the light illuminating devices 5.

In accordance with at least one program, such as reading program, installed in the memory unit, the control unit 12 is operative to control the two-dimensional photodetector 3, each of the light illuminating devices 5, and the like to execute image picking-up tasks of the target R. The control unit 12 is also electrically coupled to the LED 7, the beeper 9, and the liquid crystal display 8 to control them. Moreover, the control unit 12 is communicably coupled to the communication interface 10 to communicate with external devices including, for example, a host computer through the communication interface 10.

In addition, the control unit 12 is operative to control the exposure time (the shutter speed) of the photodetector 3.

The amplifier 13 is electrically connected to the photodetector 3 and operative to amplify the image data in analog form output from the photodetector 3 at a gain based on a gain control signal sent from the control unit 12.

The comparing circuit 16 is electrically connected to the amplifier 13, the control unit 12, and the memory 15. The comparing circuit 16 is operative to compare, under control of the control unit 12, the intensity level of each pixel of the amplified image data with a predetermined threshold level, thereby binarizing the image data of each pixel. As a result, the binarized image data of each pixel having pixel value of "1" or "0" is obtained.

The A/D converter 14 is electrically connected to the amplifier 13, the control unit 12, and the memory 15. The A/D converter 14 is operative to convert, under control of the control unit 12, the intensity level of each pixel of the amplified image data into multilevel image data (pixel value) of each pixel.

The synchronous signal generator 18 periodically generates a synchronous signal to periodically output it to the two-dimensional photodetector 3, the comparing circuit 16, the specified ratio detection circuit 17, and the address generator 19 under control of the control unit 12.

The address generator 19 periodically counts the number of the transmitted synchronous signals to generate address signals in response to the count result, thereby outputting the address signals to the memory 15.

Specifically, the binarized image data sequentially sent from the comparing circuit 16 and the multilevel image data sent from the A/D converter 14 are stored respectively in different areas of the memory 15 so as to correspond to the output address signals.

The specified-ratio detection circuit 17 is operative to detect the specified patterns (bit patterns) in the binarized image data in response to the synchronous signals based on control of the control unit 12.

In accordance with at least one program, such as decoding program, installed in the memory unit, the control unit 12 is operative to:

identify the type of the optical information code written on the target R based on the specified patterns detected by the specified-ratio detection circuit 17;

determine whether it can execute decoding processing using only the binarized image data based on the identified type of the optical information code; and execute decoding processing using at least one of the binarized image data and the multilevel image data based on the detected specified patterns.

The reading program and the decoding program can be separated as program modules, or can be integrated with each other.

The reading program and the decoding program can be loaded from a signal bearing media to the memory unit. Examples of suitable signal bearing media include recordable type media such as floppy disks and CD (Compact Disk)-ROM, and transmission type media such as digital and analog communications links.

In the first embodiment, as the photodetector 3, a general-purpose photodetector is used. The general-purpose photodetector has a light-sensitive pixel area composed of hundreds of thousand to millions of pixels arranged vertically and horizontally, and a 3:4 aspect ratio (vertical to horizontal ratio) of the pixel area.

As illustrated in FIGS. 2A, 2B, and 3A to 3C, the light-sensitive pixel area, referred to simply as "pixel area", of the photodetector 3 is divided in the vertical direction into two split pixel areas equal in size, one of which is disposed on top of the pixel area, and the other on bottom thereof.

The one of the two split pixel areas on top will be referred to as "top split pixel area 3a", and the other thereof will be referred to as "bottom split pixel area 3b". Each of the top split pixel area 3a and the bottom split pixel area 3b has a horizontal length larger than a vertical length.

For example, each of the top split pixel area 3a and the bottom split pixel area 3b has a predetermined aspect ratio (vertical to horizontal ratio) of, for example, 3:8, in other words, 1.5:4. Note that, because there is an actually unusable area at the boundary of the top split pixel area 3a and the bottom split pixel area 3b, the vertical length of each of the top and bottom split pixel areas 3a and 3b whose aspect ratio is 3:8 is even shorter than the horizontal length thereof.

The imaging optics 4 includes a pair of first and second imaging lenses 20a and 20b respectively corresponding to the pair of top and bottom split pixel areas 3a and 3b. In addition, the imaging optics 4 includes a pair of first and second reflectors 21a and 21b respectively corresponding to the pair of top and bottom split pixel areas 3a and 3b. The pair of first reflector 21a and first imaging lens 20a will be referred to as "first FOV (field of view) defining unit FC1", and the pair of second reflector 21b and second imaging lens 20b will be referred to as "second FOV defining unit FC2".

The first and second FOV defining units FC1 and FC2 are arranged such that a first FOV segment Va of the top split pixel area 3a through the first FOV defining unit FC1 and a second FOV segment Vb of the bottom split pixel area 3b through the second FOV defining unit FC2 are:

defined outward through the reading window RW toward the target R when the optical information reader 1 is located such that the reading window RW is closely opposite to the target R; and continuously aligned, with an overlap OV, on the target R parallel to the longitudinal direction (horizontal direction) LD of the reading window RW (see FIGS. 2A and 2B).

For example, each of the first and second reflectors 21a and 21b has a substantially rectangular-plate like shape. The first and second reflectors 21a and 21b are substantially aligned with each other along the boundary line between the top and bottom split pixel areas 3a and 3b.

One surface wall of the first reflector 21a faces one half part of the boundary portion of the pixel area of the photodetector 3. The first imaging lens 20a is arranged between the first reflector 21a and the reading window RW.

The first reflector 21a is inclined with respect to the surface direction of the pixel area of the photodetector 3 and to the normal line of the pixel area thereof such that:

its one corner CO1 adjacent to the second reflector 21b is located close to the boundary portion of the pixel area; and another one corner CO2 diagonally opposite to the corner CO1 is located away from the boundary portion of the pixel area as compared with the corner CO1.

The configuration of the first reflector 21a and the first imaging lens 20a provides the first FOV segment Va through the reading window RW on the target R.

In other words, the configuration of the first reflector 21a and the first imaging lens 20a allows the other surface wall WS1 of the first reflector 21a to reflect and three-dimensionally fold light (light beam) toward the top split pixel area 3a of the photodetector 3; this light (light beam) is reflected from the first FOV segment Va onto the other surface wall WS1 through the first imaging lens 20a. Precise optical alignment of the top split pixel area 3a of the photodetector 3, the first reflector 21a, and the first imaging lens 20a is established to permit the three-dimensional folding of the light by the first reflector 21a toward the top split pixel area 3a of the photodetector 3.

Similarly, one surface wall WS2 of the second reflector 21b faces the other half part of the boundary portion of the pixel area of the photodetector 3. The second imaging lens 20b is arranged between the second reflector 21b and the reading window RW.

The second reflector 21b is inclined with respect to the surface direction of the pixel area of the photodetector 3 and to the normal line of the pixel area thereof such that:

its one corner CO3 adjacent to the first reflector 21a is located close to the boundary portion of the pixel area; and another one corner CO4 diagonally opposite to the corner CO3 is located away from the boundary portion of the pixel area as compared with the corner CO3.

The configuration of the second reflector 21b and the second imaging lens 20b provides the second FOV segment Vb through the reading window RW on the target R.

In other words, the configuration of the second reflector 21b and the second imaging lens 20b allows the one surface wall WS2 of the second reflector 21b to reflect and three-dimensionally fold light toward the bottom split pixel area 3b of the photodetector 3; this light is reflected from the second FOV segment Vb onto the one surface wall WS2 through the second imaging lens 20b. Precise optical alignment of the bottom split pixel area 3b of the photodetector 3, the second reflector 21b, and the second imaging lens 20b is established to permit the three-dimensional folding of the light by the second reflector 21b toward the bottom split pixel area 3b of the photodetector 3.

As illustrated in FIGS. 2A and 3A to 3C, the first FOV segment Va has a substantially rectangular shape similar to the rectangular shape of the top split pixel area 3a of the photodetector 3. Similarly, the second FOV segment Vb has a substantially rectangular shape similar to the rectangular shape of the bottom split pixel area 3b of the photodetector 3.

Each of the first and second FOV segments Va and Vb therefore has a predetermined aspect ratio (vertical to horizontal ratio) equivalent to the aspect ratio (3:8) of each of the top and bottom split pixel areas 3a and 3b.

The first and second FOV segments Va and Vb are continuously aligned, with the overlap OV, parallel to the horizontal direction LD of the reading window RW with no gap in the vertical direction orthogonal to the horizontal direction LD. For this reason, the combination of the first and second FOV segments Va and Vb provides a wholly enlarged FOV V in the horizontal direction LD parallel to the scan direction of the photodetector 3 (see FIGS. 2A and 3C). The enlarged FOV V will also be referred to as "horizontally-oriented FOV V" or "panoramic FOV V" hereinafter.

Note that, in FIGS. 2A and 2B, the center of the first FOV segment Va is represented as "A", and the center of the second FOV segment Vb is represented as "B". Similarly, the center of the top split pixel area 3a is represented as "a", and the center of the bottom split pixel area 3b is represented as "b". In addition, an optical path connecting the center A of the first FOV segment Va and the center a of the top split pixel area 3a is represented as "La", and an optical path connecting the center B of the second FOV segment Vb and the center b of the bottom split pixel area 3b is represented as "Lb"

When the optical information reader 1 is located such that its reading window RW is positioned opposite the target R on which an optical information code is written, turning-on of the shutter switch allows the control unit 12 to control the reading mechanism 2 in accordance with the reading program installed in the memory unit. This allows the image data of the target R to be picked up by the top split pixel area 3a and the bottom split pixel area 3b of the photodetector 3.

The control unit 12 is programmed to:

detect the overlap between the image data corresponding to the pixel data of each pixel of the top split pixel area 3a and the image data corresponding to the pixel data of each pixel of the bottom split pixel area 3b;

combine the image data corresponding to the pixel data of each pixel of the top split pixel area 3a with that corresponding to the pixel data of each pixel of the bottom split pixel area 3b based on the detected overlay, thereby obtaining combined image data corresponding to the enlarged FOV (horizontally-oriented FOV) V; and decode at least one optical information code written in the target R based on the combined image data.

Operations of the optical information reader 1 will be described hereinafter.

When a user wants to read at least one item of optical information, such as a barcode, a two dimensional code, and/or one of other types of optical information codes, written on the target R, the user places the optical information reader 1 such that its reading window RW is closely opposite to the target R.

In the optical information reader locating process, if a barcode B is written on the target R (see FIG. 4A), the user locates the optical information reader 1 such that the horizontally-oriented FOV V is across all of the bars (spaces) of the barcode B. Moreover, if a plurality of two-dimensional codes, such as QR codes Q are written on the target R in alignment with each other at regular intervals (see FIG. 4B), the user locates the optical information reader 1 such that the horizontally-oriented FOV V contains all of the QR codes Q.

While the optical information reader 1 is arranged in such a state, the user turns on the shutter switch. The turning-on of the shutter switch causes the control unit 12 to execute the optical information reading tasks in accordance with the reading program and the decoding program.

Figure 5:
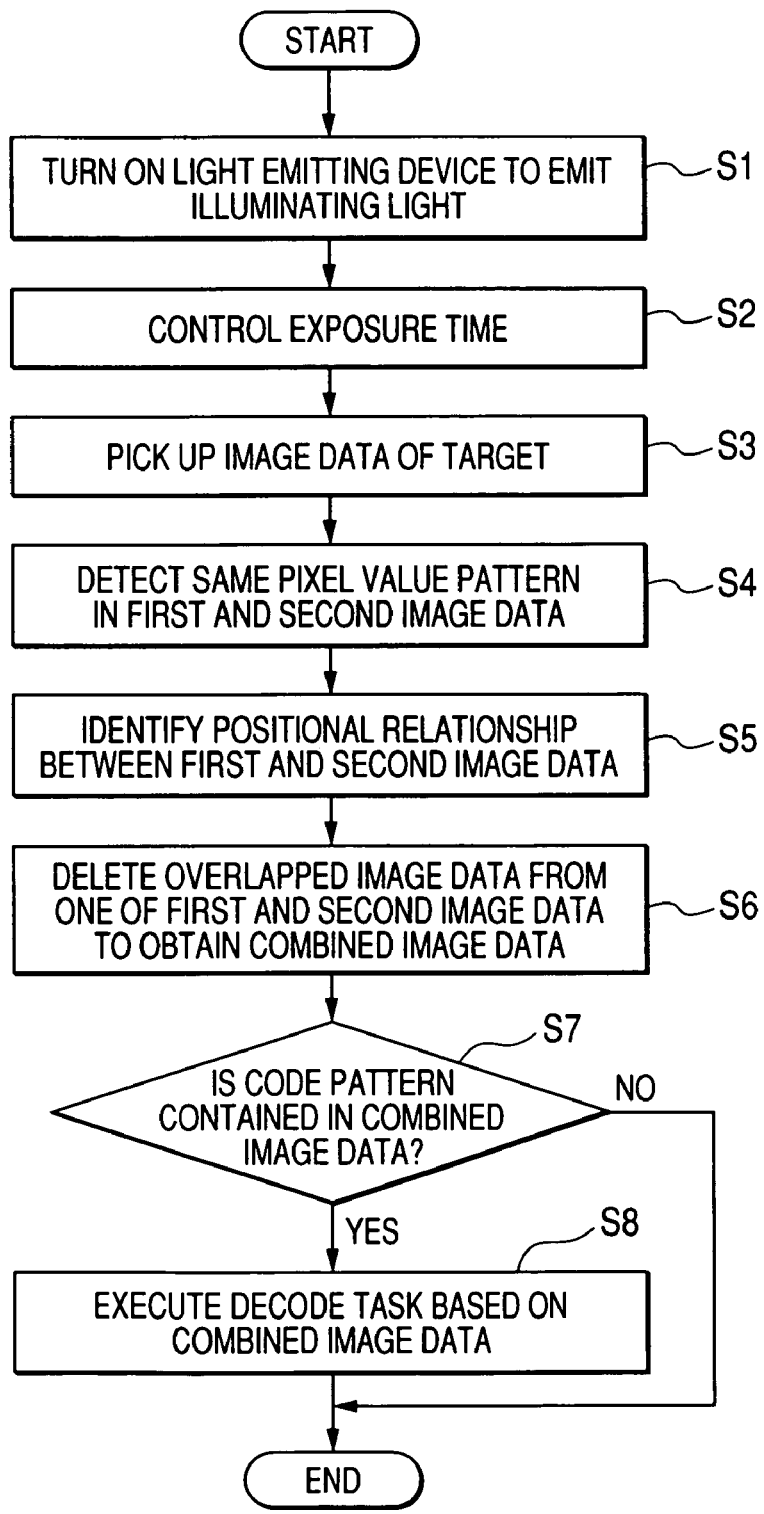
FIG. 5 is a flowchart schematically illustrating optical-information reading operations to be executed by a control unit illustrated in FIG. 1 according to the first embodiment.

The flowchart illustrated in FIG. 5 schematically shows the optical information reading tasks to be executed by the control unit 12 in response to the turning-on of the shutter switch.

Specifically, in response to the turning-on of the shutter switch, the control unit 12 causes each of the light illuminating devices 5 to emit illuminating light directed through the reading window RW to the target R so that the emitted illuminating light is irradiated on the target R in step S1 of FIG. 5.

While the illuminating light is being irradiated on the target R, light reflected from the target R is transferred by the first and second FOV defining units FC1 and FC2 into the pixel area of the photodetector 3, so that the pixel area of the photodetector 3 is exposed.

The control unit 5 controls the exposure time of the photodetector 3 in step S2, thereby picking up image data of the target R by the photodetector 3 in step S3.

As described above, in the first embodiment, the configuration of the first FOV defining unit FC1 focuses and three-dimensionally folds, toward the top split pixel area 3a of the photodetector 3, light being reflected from part of the target R contained in the first FOV segment Va. This makes it possible to pick up first image data of part of the target R contained in the first FOV segment Va by the top split pixel area 3a of the photodetector 3.

Similarly, the configuration of the second FOV defining unit FC2 focuses and three-dimensionally folds, toward the bottom split pixel area 3b of the photodetector 3, light being reflected from another part of the target R contained in the second FOV segment Vb. This makes it possible to pick up second image data of another part of the target R contained in the second FOV segment Vb by the bottom split pixel area 3b of the photodetector 3.

Because the first and second FOV segments Va and Vb are continuously aligned, with the overlap OV, parallel to the horizontal direction LD of the reading window RW, the first image data and second image data having an overlap therebetween cover a horizontally-oriented field of the target R contained in the horizontally-oriented FOV V.

Therefore, as described above, in one of the different areas of the memory 15, first and second multilevel image data, which corresponds to the horizontally-oriented FOV V and is obtained by the A/D converter 14, have been stored.

After the image picking-up task in step S3, the control unit 12 uses the first and second image data in multilevel format to detect the same pixel value pattern in the first and second image data in multilevel format in step S4.

For example, let us consider that a barcode is written in the target R and that a predetermined pattern of bars and spaces of the barcode is located in the overlap OV.

In this case, the pixel value pattern corresponding to the predetermined pattern of bars and spaces in the first image data is the same as the pixel value pattern corresponding to the predetermined pattern of bars and spaces in the second image data. For this reason, the control unit 12 compares the first image data with the second image data, thereby detecting, as a feature region, the same pixel value pattern overlapped between the first image data and the second image data based on the compared result.

After the detecting task in step S4, the control unit 12 identifies the position (each address) of the same pixel value pattern in each of the first and second image data in multilevel format, thereby identifying the positional relationship between the first and second image data in multilevel format in step S5.

Next, in step S6, the control unit 12 deletes overlapped image data corresponding to the determined position of the overlapped pixel value pattern from one of the first image data and the second image data in multilevel format based on the identified positional relationship therebetween. Then, in step S6, the control unit 12 combines the other of the first and second image data with the one of the first and second image data from which the overlapped image data has been deleted, thereby obtaining combined image data in multilevel format corresponding to the horizontally-oriented FOV V.

In the next step S7, the control unit 12 determines whether a code pattern corresponding at least one of optical information codes, such as barcodes, two-dimensional codes, and other types of codes is contained in the combined image data in multilevel format.

If it is determined that no code patterns are contained in the combined image data (the determination in step S7 is NO), the control unit 12 exits the optical information reading tasks.

Otherwise if it is determined that a code pattern is contained in the combined image data (the determination in step S7 is YES), the control unit 12 proceeds to step S8. In step S8, the control unit 12 executes the decoding task set forth above.

Specifically, the control unit 12 identifies the type of the code pattern based on the specified patterns detected by the specified-ratio detection circuit 17, and executes the decoding processing using the combined image data in multilevel format.

After the decoding task in step S8, the control unit 12 stores the decoded result in a predetermined area of the memory 15.

As set forth above, let us consider a user wants to read a horizontally-oriented barcode B written on the target R (see FIG. 4A) using the optical information reader 1 according to the first embodiment. In this case, because the optical information reader 1 is configured to provide the horizontally-oriented FOV V, the user easily locates the optical information reader 1 such that its reading window RW is closely opposite to the target R and that the horizontally-oriented FOV V is across all of the bars (spaces) of the barcode B.

Accordingly, it is possible for the optical information reader 1 according to the first embodiment to easily read the horizontally-oriented barcode B (see FIG. 4A) without the need of separating the reader 1 from the barcode B as in the case of using the conventional optical information reader.

Similarly, let us consider a user wants to read a plurality of two-dimensional codes Q written on the target R in alignment with each other at regular intervals (see FIG. 4B) using the optical information reader 1 according to the first embodiment.

In this case, because the optical information reader 1 is configured to provide the horizontally-oriented FOV V, the user easily locates the optical information reader 1 such that:

the reading window RW is closely opposite to the target R with the horizontal direction (longitudinal direction) of the reading window RW being parallel to the alignment direction of the two-dimensional codes; and the horizontally-oriented FOV V contains all of the two-dimensional codes Q.

Accordingly, it is possible for the optical information reader 1 according to the first embodiment to easily read collectively all of the two-dimensional codes Q (see FIG. 4B) without the need of separating the reader 1 from the two-dimensional codes Q as in the case of using the conventional optical information reader.

In addition, the optical information reader 1 according to the first embodiment is configured to read various items of optically readable information written on the target R using all of the pixels of the pixel area of the photodetector 3. The optical information reader 1 therefore allows effective use of all of the pixels of the pixel area of the photodetector 3, which is different from the digital cameras disclosed in the Patent Publication No. H10-341361 and designed to delete part of the image data corresponding to one-quarter region of either side of the light sensitive pixel area in its height direction (vertical direction) to generate panoramic image data. Accordingly, it is possible for the optical information reader 1 to read various items of optically readable information with high resolution.

It follows from what has been described above that the optical information reader 1 according to the first embodiment includes:

the commonly-used photodetector 3 whose pixel area has a 3:4 aspect ratio (vertical to horizontal ratio); this pixel area is divided in the vertical direction into the top and bottom split pixel areas 3a and 3b; and the first and second FVO defining units FC1 and FC2 arranged such that the first FOV segment Va through the first defining unit FC1 and the second FOV segment Vb through the second defining unit FC2 are directed through the reading window RW toward the target R and continuously aligned, with the overlap OV, parallel to the horizontal direction LD of the reading window RW.

Specifically, the first and second FOV segments Va and Vb continuously aligned, with the overlap OV, parallel to the horizontal direction LD of the reading window RW provide the horizontally-oriented FOV V. Because each of the first and second FOV segments Va and Vb is a 3:8 aspect ratio (vertical to horizontal ratio), the horizontally-oriented FOV V has a substantially 3:16 aspect ratio (vertical to horizontal ratio) if the overlap OV is ignored.

The horizontally-oriented FOV V allows the optical information reader 1 to easily obtain horizontally-oriented image data with the number of pixels per unit area of the photodetector 3 being kept constant; this number of pixels per unit area means the resolution of the photodetector 3. The horizontally-oriented image data obtained with the use of the horizontally-oriented FOV V cannot be normally obtained unless using at least two photodetector horizontally aligned with each other and each having a 3:8 aspect ratio (vertical to horizontal ratio).

In addition, in the first embodiment, the first and second FOV segments Va and Vb continuously aligned, with the overlap OV, parallel to the horizontal direction LD of the reading window RW provide the horizontally-oriented FOV V. For this reason, it is possible to easily grasp the positional relationship between the first image data corresponding to the first FOV segment Va and the second image data corresponding to the second FOV segment Vb using the position of the overlap OV as a benchmark. Accordingly, the first image data corresponding to the first FOV segment Va and the second image data corresponding to the second FOV segment Vb can be easily and securely combined with each other.

In addition, because the first and second FOV segments Va and Vb are partially overlapped with each other, it is possible to prevent image data at the overlap OV from dropping out during the combination of the first image data corresponding to the first FOV segment Va and the second image data corresponding to the second FOV segment Vb.

As described above, the optical information reader 1 with the commonly-used photodetector 3 whose pixel area has a 3:4 aspect ratio (vertical to horizontal ratio) can effectively use the pixel area of the photodetector 3. This allows easily readout of barcodes having a relatively large length (width) across its bars and spaces compared with other normal barcodes, and collectively readout of a plurality of two-dimensional codes aligned with each other with regular intervals.

In addition, the optical information reader 1 can read and decode various items of optically readable information, such as the barcodes and two-dimensional codes set forth above, with high resolution, making it possible to obtain high reading performance of the optical information reader 1.

Second Embodiment

An optical information reader according to a second embodiment of the present invention will be described hereinafter with reference to FIGS. 6 to 8.

The different point of the optical information reader according to the second embodiment from that according to the first embodiment is the software structure of the control unit 12. For this reason, like reference characters are assigned to like parts in the optical information readers according to the first and second embodiments so that descriptions of the parts of the optical information reader according to the second embodiment will be omitted.

Figure 6:
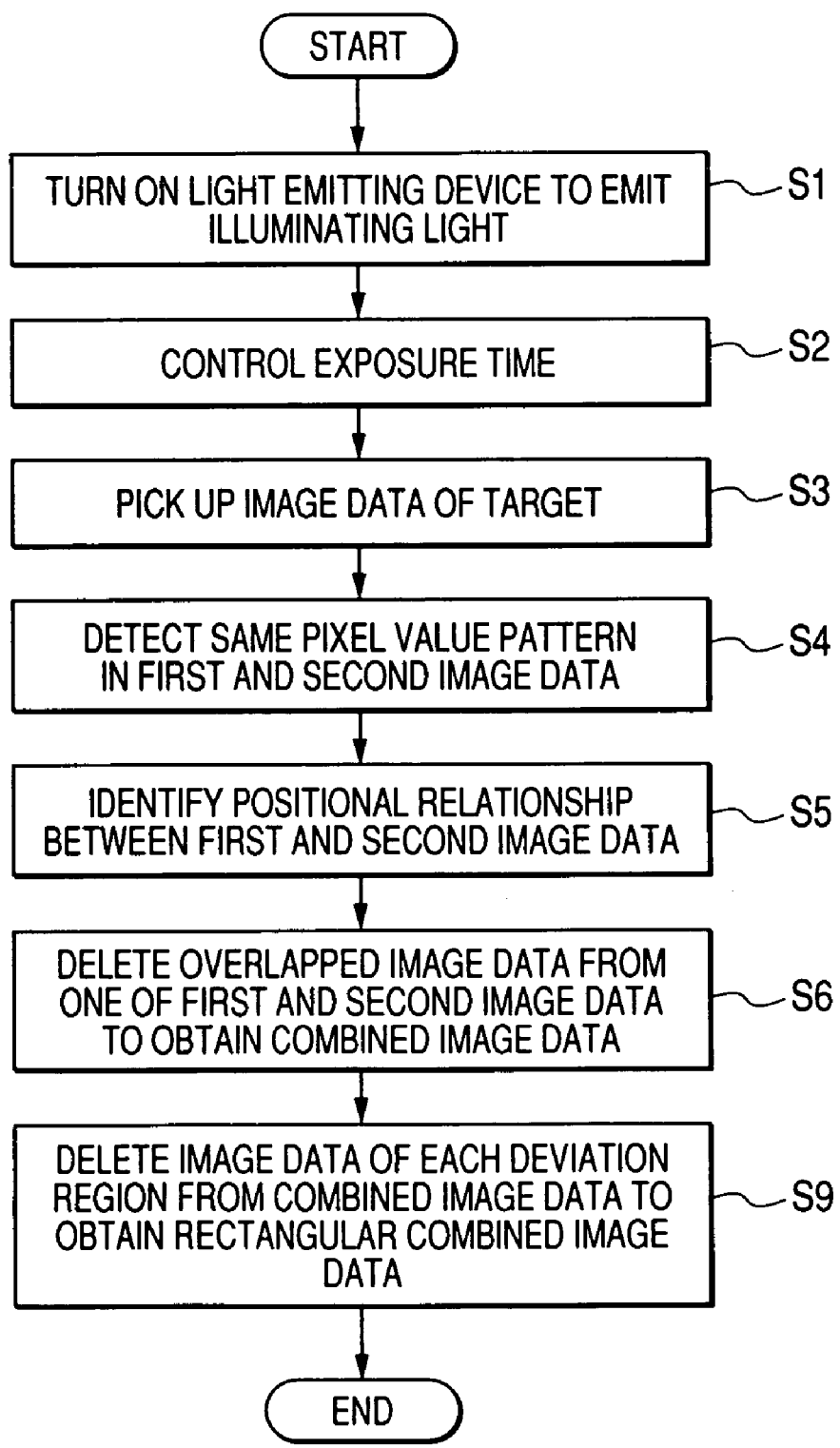
FIG. 6 is a flowchart schematically illustrating optical-information reading operations to be executed by a control unit according to a second embodiment of the present invention.

As illustrated in FIG. 6, as is the case with the first embodiment, in response to the turning-on of the shutter switch, the control unit 12 executes:

the light-illuminating device control task (step S1),
the exposure-time control task (step S2),
the image picking-up task (step S3),
the pixel value pattern detecting task (step S4),
the positional relationship identifying task (step S5), and
the combined image data obtaining task (step S6).

Figure 7:
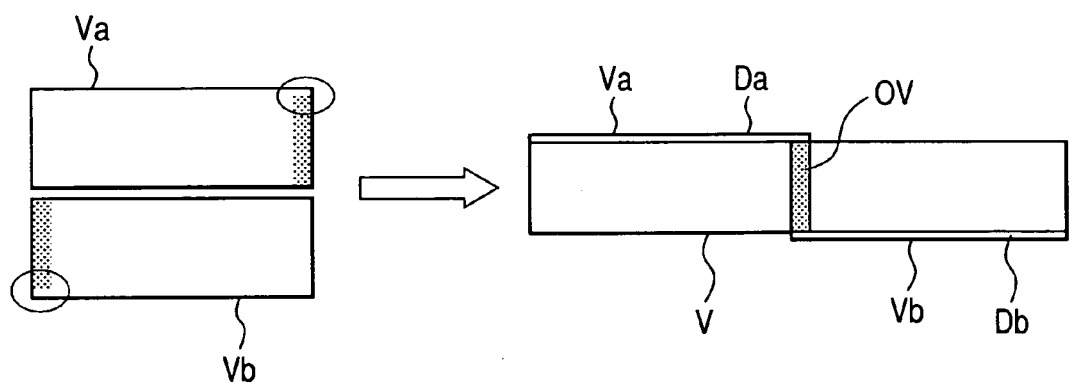
FIG. 7 is a view schematically illustrating deviation regions existing between the first and second FOV segments according to the second embodiment.

Particularly, in the second embodiment, the first and second FOV segments Va and Vb are continuously aligned, with the overlap OV, parallel to the horizontal direction LD of the reading window RW such that there are deviation regions Da and Db in the vertical direction orthogonal to the horizontal direction LD (see FIG. 7).

Specifically, in the positional relationship identifying task (step S5), the control unit 12 can grasp the existence of the deviation regions Da and Db and the positions thereof based on the position of the overlapped pixel value pattern (see hatchings represented by the reference character OV in FIG. 7) in each of the first and second image data.

Therefore, in the combined image data obtaining task in step S6, the combined image data containing deviated image data of each of the deviation regions Da and Db are obtained.

After the combined image data obtaining task in step S6, the control unit 12 therefore deletes the image data of each of the deviation regions Da and Db from the combined image data, thereby obtaining rectangular combined image data corresponding to the horizontally-oriented FOV V with no deviation regions in the vertical direction in step S9.

Thereafter, in the second embodiment, the control unit 12 stores the rectangular combined image data in a predetermined area of the memory 15 without decoding it. In this case, the rectangular combined image data stored in the memory 15 can be transmitted by the control unit 12 to, for example, an external host computer, such as a personal computer, through the communication interface 10, so that the combined image data transmitted to the host computer can be decoded thereby.

As described above, as in the case of the first embodiment, the optical information reader 1 with the commonly-used photodetector 3 whose pixel area has a 3:4 aspect ratio (vertical to horizontal ratio) can easily read, with high resolution, horizontally-oriented targets that ate optically readable, making it possible to obtain high reading performance of the optical information reader 1.

In addition, in the second embodiment, it is assumed that there are errors in optical alignment between at least one of the first and second reflectors 21a and 21b and the corresponding at least one of the first and second imaging lenses 20a and 20b, and/or between at least one of the first and second reflectors 21a and 21b and the corresponding at least one of the top and bottom split pixel areas 3a and 3b, which causes the deviation regions Da and Db between the first and second FOV segments Va and Vb.

In this assumption, the optical information reader 1 can absorb the errors to obtain rectangular combined image without the deviation regions Da and Db.

The optical information reader 1 according to the second embodiment can serve as a digital camera that can take panoramic images whose horizontal length is longer than its vertical length.

Figure 8:
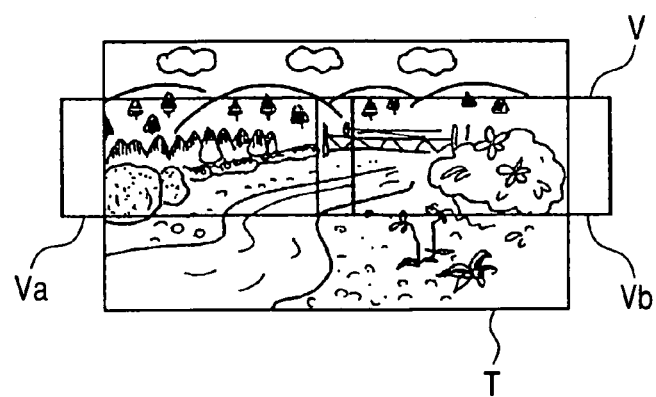
FIG. 8 is a view schematically illustrating how to take a panoramic image of a target using the optical information reader according to the second embodiment as a digital camera.

For example, as illustrated in FIG. 8, when a user wants to take part of a target T, such as a scene, using the optical information reader 1 serving as a digital camera, the user positions the digital camera 1 such that the horizontally-oriented FOV V contains part of the target T to be taken. This allows a panoramic image of part of the target T contained in the horizontally-oriented FOV V to be taken with high resolution.

Third Embodiment

An optical information reader according to a third embodiment of the present invention will be described hereinafter with reference to FIGS. 9 to 11. The different point of the optical information reader according to the third embodiment from that according to the first embodiment is the structure of a reading mechanism 31. For this reason, except for the reading mechanism 31, like reference characters are assigned to like parts in the optical information readers according to the first and third embodiments so that descriptions of the parts of the optical information reader according to the third embodiment will be omitted.

Figure 9:
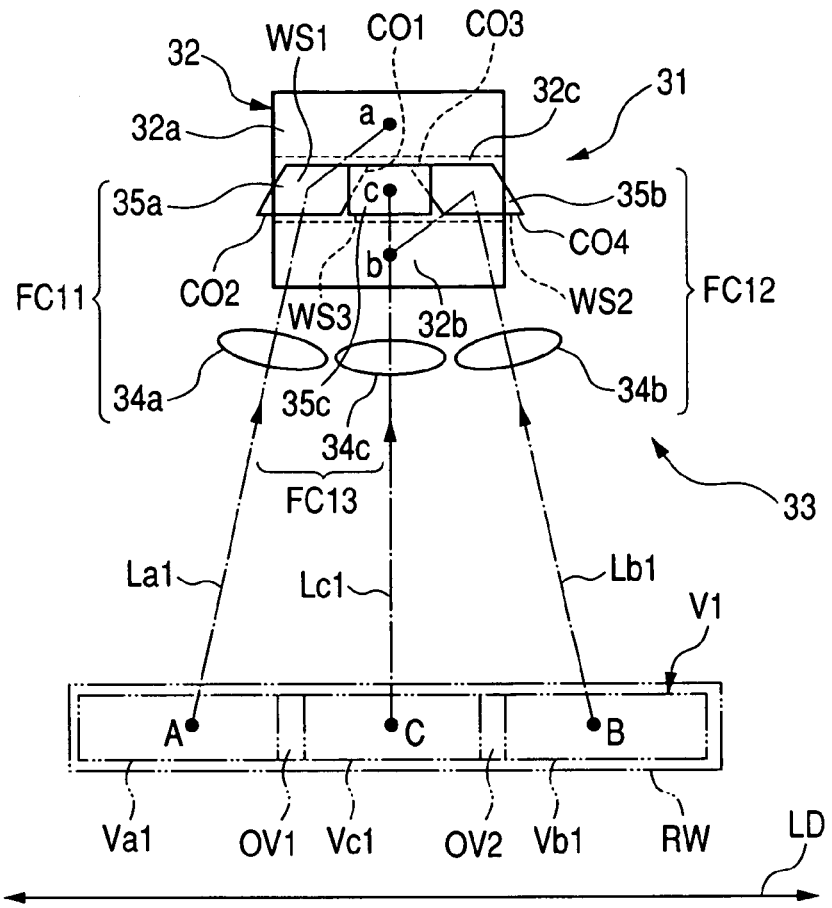
FIG. 9 is a view schematically illustrating part of a reading mechanism when it is viewed from the opposite side of a pixel area of a two-dimensional photodetector according to a third embodiment of the present invention.

FIG. 9 schematically illustrates part of the reading mechanism 31. The reading mechanism 31 includes a two-dimensional photodetector 32, and an imaging optics 33 operative to focus an image of a target R onto a light-sensitive pixel area of the photodetector 32. The reading mechanism 31 also includes a plurality of illuminating devices 5 (not shown) operative to irradiate illuminating light directed through the reading window to the target R.

As well as the first embodiment, the photodetector 32 is arranged such that the horizontal direction of the pixel area is parallel to the longitudinal direction of the reading window RW, and that the vertical direction of the pixel area is orthogonal to the lateral direction of the reading window RW.

Like the first embodiment, as the photodetector 32, a general-purpose photodetector is used. The general-purpose photodetector has a light-sensitive pixel area composed of hundreds of thousand to millions of pixels arranged vertically and horizontally, and a 3:4 aspect ratio (vertical to horizontal ratio) of the pixel area.

Figure 10:
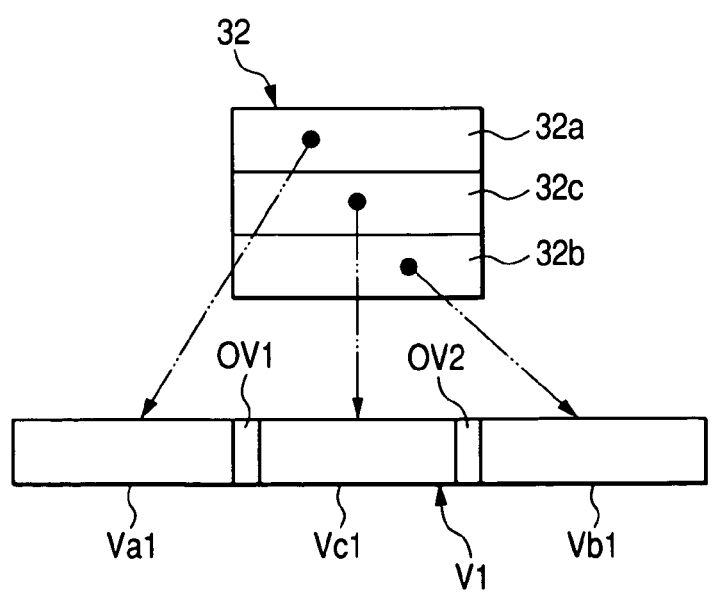
FIG. 10 is a view schematically illustrating how to pick up image data contained in a horizontally-oriented FOV by top, middle, and bottom split pixel areas of the two-dimensional photodetector illustrated in FIG. 9.

As illustrated in FIGS. 9 and 10, the light-sensitive pixel area of the photodetector 32 is divided in the vertical direction into three split pixel areas equal in size, one of which is disposed on top of the pixel area, another one of which is disposed on bottom thereof, and the remaining is disposed therebetween. The one of the three split pixel areas on top will be referred to as "top split pixel area 32a", another one of the three split pixel area will be referred to as "bottom split pixel area 32b", and the remaining will be referred to as "middle split pixel area 32c".

Each of the top split pixel area 32a, bottom split pixel area 32b, and middle split pixel area 32c has a horizontal length larger than a vertical length. For example, each of the top split pixel area 32a, bottom split pixel area 32b, and middle split pixel area 32c has a predetermined aspect ratio (vertical to horizontal ratio) of, for example, 1:4.

The imaging optics 33 includes first, second, and third imaging lenses 34a, 34b, and 34c respectively corresponding to the top, bottom, and middle split pixel areas 32a, 32b, and 32c. In addition, the imaging optics 33 includes first, second, and third reflectors 35a, 35b, and 35c respectively corresponding to the top, bottom, and middle split pixel areas 32a, 32b, and 32c. The pair of first reflector 35a and first imaging lens 34a will be referred to as "first FOV defining unit FC11", and the pair of second reflector 35b and second imaging lens 34b will be referred to as "second FOV defining unit FC12". In addition, the pair of third reflector 35c and third imaging lens 34c will be referred to as "third FOV defining unit FC13".

The first to third FOV defining units FC11 to FC13 are arranged such that a first FOV segment Va1 of the top split pixel area 32a through the first FOV defining unit FC11, a second FOV segment Vb1 of the bottom split pixel area 32b through the second FOV defining unit FC12, and a third FOV segment Vc1 of the middle split pixel area 32c through the third FOV defining unit 13 are:

directed through the reading window RW toward the target R; and continuously aligned, with first and second overlaps OV1 and OV2, parallel to the longitudinal direction (horizontal direction) LD of the reading window RW.

For example, each of the first to third reflectors 35a to 35c has a substantially rectangular-plate like shape. The first to third reflectors 35a to 35c are substantially aligned with each other along the surface direction of the middle split pixel area 32c.

One surface wall of the first reflector 35a faces one-third part of one end of the middle split pixel area 32c of the photodetector 32. The first imaging lens 34a is arranged between the first reflector 35a and the reading window RW.

The first reflector 35a is inclined with respect to the surface direction of the pixel area of the photodetector 32 and to the normal line of the pixel area thereof such that:

its one corner CO1 adjacent to the third reflector 35c is located close to the middle split pixel area 32c of the photodetector 32; and another one corner CO2 diagonally opposite to the corner CO1 is located away from the middle split pixel area 32c of the photodetector 32 as compared with the corner CO1.

The configuration of the first reflector 35a and the first imaging lens 34a provides the first FOV segment Va1 through the reading window RW.

In other words, the configuration of the first reflector 35a and the first imaging lens 34a allows the other surface wall WS1 of the first reflector 35a to reflect and three-dimensionally fold light toward the top split pixel area 32a of the photodetector 32; this light is reflected from the first FOV segment Va1 onto the other surface wall WS1 through the first imaging lens 34a.

Precise optical alignment of the top split pixel area 32a of the photodetector 32, the first reflector 35a, and the first imaging lens 34a is established to permit the three-dimensional folding of the light by the first reflector 35a toward the top split pixel area 32a of the photodetector 32.

Similarly, one surface wall WS2 of the second reflector 35b faces another one-third part of the other end of the middle split pixel area 32c of the photodetector 32. The second imaging lens 34b is arranged between the second reflector 35b and the reading window RW.

The second reflector 35b is inclined with respect to the surface direction of the pixel area of the photodetector 32 and to the normal line of the pixel area thereof such that:

its one corner CO3 adjacent to the third reflector 35c is located close to the middle split pixel area 32c of the photodetector 32; and another one corner CO4 diagonally opposite to the corner CO3 is located away from the middle split pixel area 32c of the photodetector 32 as compared with the corner CO3.

The configuration of the second reflector 35b and the second imaging lens 34b provides the second FOV segment Vb1 through the reading window RW located in alignment with the first FOV segment Va1 in the horizontal direction at a given interval.

In other words, the configuration of the second reflector 35b and the second imaging lens 34b allows the one surface wall WS2 of the second reflector 35b to reflect and three-dimensionally fold light toward the bottom split pixel area 32b of the photodetector 32; this light is reflected from the second FOV segment Vb1 onto the one surface wall WS2 through the second imaging lens 34b.

Precise optical alignment of the bottom split pixel area 32b of the photodetector 32, the second reflector 35b, and the second imaging lens 34b is established to permit the three-dimensional folding of the light by the second reflector 35b toward the bottom split pixel area 32b of the photodetector 32.

In addition, one surface wall WS3 of the third reflector 35c faces the remaining one-third part of the middle split pixel area 32c of the photodetector 32; this remaining one-third part is located between the one-third part and another one-third part of the middle split pixel area 32c. The third imaging lens 34c is arranged between the third reflector 35c and the reading window RW.

The third reflector 35c is inclined with respect to the surface direction of the pixel area of the photodetector 32 and to the normal line of the pixel area thereof such that:

its one longitudinal side wall adjacent to the corners CO1 and CO3 is located close to the middle split pixel area 32c of the photodetector 32; and the other longitudinal side wall opposite to the one longitudinal side wall is located away from the middle split pixel area 32c of the photodetector 32 as compared with the one longitudinal side wall.

The configuration of the third reflector 35c and the third imaging lens 34c provides the third FOV segment Vc1 located at the interval between the first and second FOV segments Va1 and Vb1 in alignment therewith in the horizontal direction LD such that there are the first overlap OV1 between the first and third FOV segments Va1 and Vc1 and the second overlap OV2 between the second and third FOV segments Vb1 and Vc1.

In other words, the configuration of the third reflector 35c and the third imaging lens 34c allows the one surface wall WS3 of the third reflector 35c to reflect and three-dimensionally fold light toward the middle split pixel area 32c of the photodetector 32; this light is reflected from the third FOV segment Vc1 onto the one surface wall WS3 through the third imaging lens 34c.

Precise optical alignment of the middle split pixel area 32c of the photodetector 32, the third reflector 35c, and the third imaging lens 34c is established to permit the three-dimensional folding of the light by the third reflector 35c toward the middle split pixel area 32c of the photodetector 32.

As illustrated in FIGS. 9 and 10, the first FOV segment Va1 has a substantially rectangular shape similar to the rectangular shape of the top split pixel area 32a of the photodetector 32. Similarly, the second FOV segment Vb1 has a substantially rectangular shape similar to the rectangular shape of the bottom split pixel area 32b of the photodetector 32, and the third FOV segment Vc1 has a substantially rectangular shape similar to the rectangular shape of the middle split pixel area 32c of the photodetector 32.

Each of the first, second, and third FOV segments Va1, Vb1, and Vc1 therefore has a predetermined aspect ratio (vertical to horizontal ratio) equivalent to the aspect ratio (1:4) of each of the top, bottom, and middle split pixel areas 32a, 32b, and 32c.

The first, third, and second FOV segments Va1, Vc1, and Vb1 are continuously aligned, with the first and second overlaps OV1 and OV2, parallel to the horizontal direction LD of the reading window RW with no gap in the vertical direction orthogonal to the horizontal direction LD. For this reason, the first, third, and second FOV segments Va1, Vc1, and Vb1 provide a wholly enlarged FOV V1 in the horizontal direction LD parallel to the scan direction of the photodetector 32 (see FIGS. 9 and 10). The enlarged FOV V1 will also be referred to as "horizontally-oriented FOV V1" hereinafter.

The longitudinal length of each of the first to third FOV segments Va1 to Vc1 in the horizontal direction is longer than that of each of the first and second FOV segments Va and Vb in the horizontal direction according to the first embodiment. For this reason, the longitudinal length of the horizontally-oriented FOV V1 in the horizontal direction is even longer than that of the longitudinal length of the horizontally-oriented FOV V in the horizontal direction.

Note that, in FIG. 9, the centers of the first to third FOV segments Va1 to Vc1 are represented as "A" to "C", respectively. Similarly, the center of the top split pixel area 32a is represented as "a", the center of the bottom split pixel area 32b is represented as "b", and the center of the middle split pixel area 32c is represented as "c".

In addition, an optical path connecting the center A of the first FOV segment Va1 and the center a of the top split pixel area 32a is represented as "La", and an optical path connecting the center B of the second FOV segment Vb1 and the center b of the bottom split pixel area 32b is represented as "Lb". In addition, an optical path connecting the center C of the third FOV segment Vc1 and the center c of the middle split pixel area 32c is represented as "Lc".

As is the case with the optical information reader 1 according to the first embodiment, in response to the turning-on of the shutter switch, the control unit 12 executes:

the light-illuminating device control task (step S1),
the exposure-time control task (step S2),
the image picking-up task (step S3),
the pixel value pattern detecting task (step S4),
the positional relationship identifying task (step S5),
the combined image data obtaining task (step S6),
the code-pattern detecting task (step S7), and
the decoding task (step S8).

Specifically, in step S3, the configuration of the first FOV defining unit FC11 focuses and three-dimensionally folds, toward the top split pixel area 32a of the photodetector 32, light being reflected from part of the target R contained in the first FOV segment Va1. This makes it possible to pick up first image data of part of the target R contained in the first FOV segment Va1 by the top split pixel area 32a of the photodetector 32.

Similarly, the configuration of the second FOV defining unit FC12 focuses and three-dimensionally folds, toward the bottom split pixel area 32b of the photodetector 32, light being reflected from another part of the target R contained in the second FOV segment Vb1. This makes it possible to pick up second image data of another part of the target R contained in the second FOV segment Vb1 by the bottom split pixel area 32b of the photodetector 32.

In addition, the configuration of the third FOV defining unit FC13 focuses and three-dimensionally folds, toward the middle split pixel area 32c of the photodetector 32, light being reflected from another part of the target R contained in the third FOV segment Vc1. This makes it possible to pick up third image data of another part of the target R contained in the third FOV segment Vc1 by the middle split pixel area 32c of the photodetector 32.

The first, third, and second FOV segments Va1, Vc1, and Vb1 are continuously aligned, with the first and second overlaps OV1 and OV2, parallel to the horizontal direction LD of the reading window RW. For this reason, the first image data, second image data, and third image data having overlaps therebetween cover a horizontally-oriented field of the target R contained in the horizontally-oriented FOV V1.

Therefore, as described above, in one of the different areas of the memory 15, first, second, and third binarized image data, which corresponds to the horizontally-oriented field of the target R contained in the horizontally-oriented FOV V1 and is obtained by the comparing circuit 16, have been stored. In addition, in another one of the different areas of the memory 15, first, second, and third multilevel image data, which corresponds to the horizontally-oriented FOV V1 and is obtained by the A/D converter 14, have been stored.

Next, in step S4, the first same pixel pattern is detected between the adjacent first and third image data in multilevel format, and the second same pixel pattern is detected between the adjacent second and third image data in multilevel format.

Subsequently, in step S5, the position (each address) of the first same pixel value pattern is identified in each of the first and third image data, and the position of the second pixel value pattern is identified in each of the second and third image data. Each of the identified position of each of the first and second same pixel value patterns allows the control unit 12 to identify the positional relationship between the first, second, and third image data.

As a result, in step S6, first overlapped image data corresponding to the determined position of the first same pixel value pattern is deleted from one of the first and third image data based on the identified positional relationship therebetween.

For example, in the third embodiment, the first overlapped image data is deleted from the third image data. Similarly, in step S6, second overlapped image data corresponding to the determined position of the second same pixel value pattern is deleted from one of the second and third image data based on the identified positional relationship therebetween. For example, in the third embodiment, the second overlapped image data is deleted from the third image data.

Therefore, in step S6, the first image data, the second image data, and the remaining third image data from which the first and second overlapped image data have been deleted are combined with each other, so that combined image data in multilevel format corresponding to the horizontally-oriented FOV V1 is obtained.

Because the code-pattern detecting task (step S7) and the decoding task (step S8) on the combined image data corresponding to the horizontally-oriented FOV V1 are substantially identical with those on the combined image data corresponding to the horizontally-oriented FOV V according to the first embodiment, descriptions of which are omitted.

As described above, as in the case of the first embodiment, the optical information reader with the commonly-used photodetector 32 can easily read, with high resolution, horizontally-oriented targets that ate optically readable, making it possible to obtain high reading performance of the optical information reader 1.

Figure 11A:
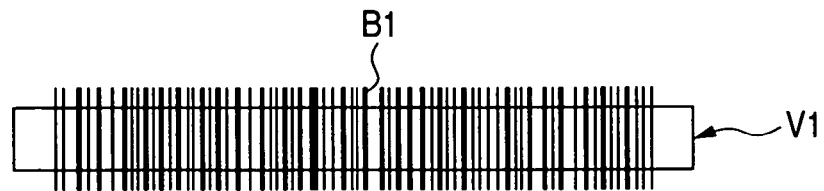
FIG. 11A is a view schematically illustrating a positional relationship between the horizontally-oriented FOV and a barcode according to the third embodiment.

For example, let us consider a user wants to read a barcode B1 written on the target R and having a large amount of data and a very large length across its bars and spaces using the optical information reader according to the third embodiment (see FIG. 11A). In this case, because the optical information reader is configured to provide the horizontally-oriented FOV V1 having a sufficient large longitudinal length, the user easily positions the optical information reader such that its reading window RW is closely opposite to the target R and that the horizontally-oriented FOV V1 is across all of the bars (spaces) of the barcode B1.

Accordingly, it is possible for the optical information reader according to the third embodiment to easily read, with high resolution, the barcode B1 written on the target R and having a large amount of data and a very large length across its bars and spaces (see FIG. 11A) without the need of separating the reader 1 from the barcode B1 as in the case of using the conventional optical information reader.

As another example, let us consider a user wants to read a character string (for example, "US PATENT PUBLICATIONS ISSUED IN 2005") CS containing characters and/or symbols horizontally aligned written on the target R (see FIG. 11B) using an OCR (Optical Character Recognition) function of the optical information reader according to the third embodiment. In this case, because the optical information reader is configured to provide the horizontally-oriented FOV V1 having a sufficient large longitudinal length, the user easily positions the optical information reader such that:

the reading window RW is closely opposite to the target R with the horizontal direction LD of the reading window RW being parallel to the alignment direction of the character string; and the horizontally-oriented FOV V1 contains all of the characters and/or symbols in the character string CS.

Figure 11B:
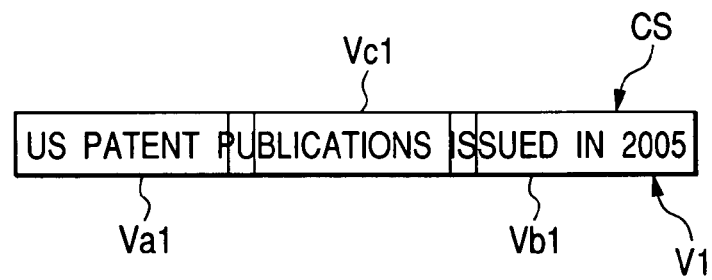
FIG. 11B is a view schematically illustrating a positional relationship between the horizontally-oriented FOV and a character string containing characters and/or symbols horizontally aligned according to the third embodiment.

Accordingly, it is possible for the optical information reader according to the third embodiment to easily read, with high resolution, collectively all of the characters and/or symbols contained in the character string CS (see FIG. 11B).

Fourth Embodiment

An optical information reader according to a fourth embodiment of the present invention will be described hereinafter with reference to FIG. 12.

The optical information reader according to the fourth embodiment is a modification of the optical information reader according to the third embodiment of the present invention.

Specifically, in the fourth embodiment, the first to third FOV defining units FC11 to FC13 are arranged such that a first FOV segment Va2 of the top split pixel area 32a through the first FOV defining unit FC11, a second FOV segment Vb2 of the bottom split pixel area 32b through the second FOV defining unit FC12, and a third FOV segment Vc2 of the middle split pixel area 32c through the third FOV defining unit 13 are:

defined outward through the reading window RW toward the target R when the optical information reader is located such that the reading window RW is closely opposite to the target R; and continuously aligned, with first and second overlaps OV1a and OV2a, on the target R to be slanted off the longitudinal direction (horizontal direction) LD of the reading window RW.

Figure 12:
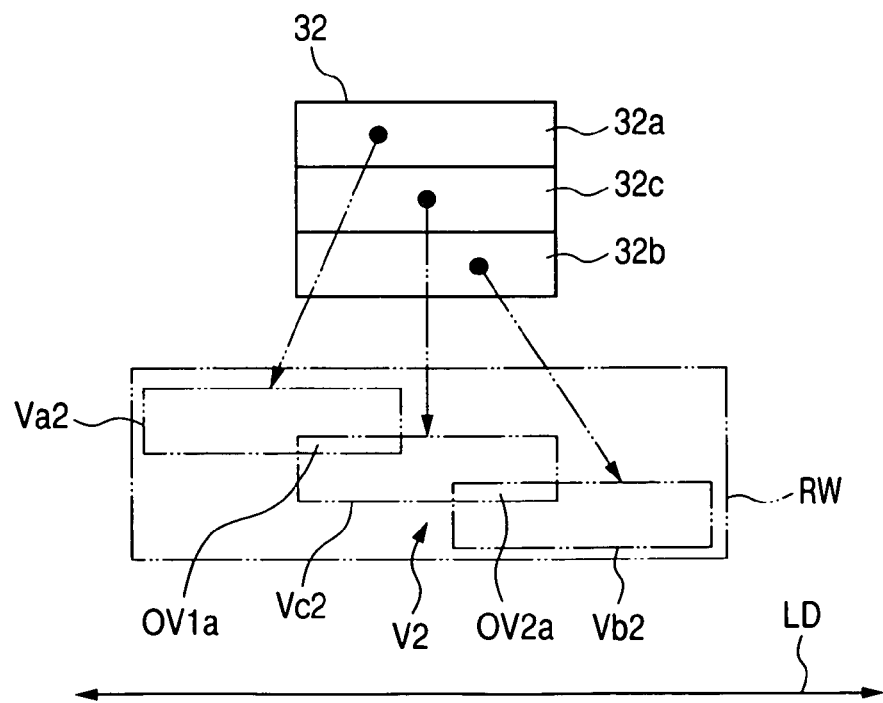
FIG. 12 is a view schematically illustrating how to pick up image data contained in a horizontally-oriented FOV by top, middle, and bottom split pixel areas of a two-dimensional photodetector according to a fourth embodiment of the present invention.

Specifically, as illustrated in FIG. 12, the first, third, and second FOV segments Va2, Vc2, and Vb2 are continuously aligned, with the first and second overlaps OV1a and OV2a, substantially parallel to one of the diagonal lines of the reading window RW.

For example, adjustment of the inclined angle of each of the first to third reflectors 35a to 35c with respect to the surface direction of the pixel area of the photodetector 32 and to the normal line of the pixel area thereof allows the diagonal alignment of the first, third, and second FOV segments Va2, Vc2, and Vb2.

As illustrated in FIG. 12, the first FOV segment Va2 has a substantially rectangular shape similar to the rectangular shape of the top split pixel area 32a of the photodetector 32. Similarly, the second FOV segment Vb2 has a substantially rectangular shape similar to the rectangular shape of the bottom split pixel area 32b of the photodetector 32, and the third FOV segment Vc2 has a substantially rectangular shape similar to the rectangular shape of the middle split pixel area 32c of the photodetector 32.

The first, third, and second FOV segments Va2, Vc2, and Vb2 are continuously aligned, with the first and second overlaps OV1 and OV2, to be slanted off the horizontal direction LD of the reading window RW. For this reason, the first, third, and second FOV segments Va2, Vc2, and Vb2 provide a wholly enlarged FOV V2 in the diagonal direction with respect to the horizontal direction LD parallel to the scan direction of the photodetector 32 (see FIG. 12).

Accordingly, it is possible for the optical information reader according to the fourth embodiment to easily set, in the diagonally enlarged FOV V2, diagonally-oriented items of optically readable information written on the target R and having a large amount of data, thereby easily reading, with high resolution, the diagonally-oriented items.

Specifically, as described in the first to third embodiments, adjustment of:

the number of divisions of the pixel area of the photodetector in the vertical direction, the number of the FOV defining units corresponding to the number of divisions, and the inclined angle of each of the reflectors with respect to the surface direction of the pixel area of the photodetector and to the normal line of the pixel area thereof, can provide arbitrary alignments of FOV segments. This makes it possible to provide enlarged FOVs having various shapes that can meet various shapes of targets to be read (taken).

Fifth Embodiment

An optical information reader according to a fifth embodiment of the present invention will be described hereinafter with reference to FIGS. 13A and 13B. The different point of the optical information reader according to the fifth embodiment from that according to the first embodiment is the structure of a reading mechanism 40. For this reason, except for the reading mechanism 40, like reference characters are assigned to like parts in the optical information readers according to the first and fifth embodiments so that descriptions of the parts of the optical information reader according to the fifth embodiment will be omitted.

Figures 13A, 13B:
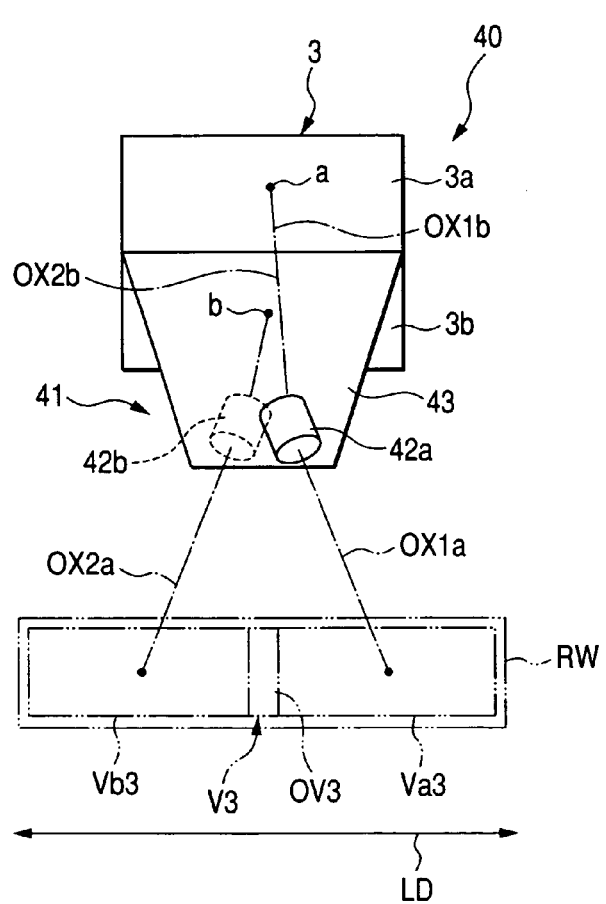
FIG. 13A is a view schematically illustrating part of a reading mechanism when it is viewed from the opposite side of a pixel area of a two-dimensional photodetector according to a fifth embodiment of the present invention.
FIG. 13B is a schematic side view of the part of the reading mechanism illustrated in FIG. 13A.

FIGS. 13A and 13B schematically illustrate part of the reading mechanism 40. The reading mechanism 40 includes a two-dimensional photodetector 3 and an imaging optics 41 operative to focus an image of a target R on a light-sensitive pixel area of the photodetector 3. The reading mechanism 40 also includes a plurality of illuminating devices 5 (not shown) operative to irradiate illuminating light directed through the reading window RW to the target R.

In the fifth embodiment, the photodetector 3 is arranged such that the horizontal direction of the pixel area is parallel to the longitudinal direction of the reading window RW, and that the vertical direction of the pixel area is parallel to the lateral direction of the reading window RW (see FIGS. 13A and 13B).

Like the first embodiment, as the photodetector 3, a general-purpose photodetector is used.

In addition, like the first embodiment, the light-sensitive pixel area of the photodetector 3 is divided in the vertical direction into top and bottom split pixel areas 3a and 3b equal in size.

The imaging optics 41 consists of a pair of first and second imaging lenses 42a and 42b as imaging optical elements, which respectively correspond to the top and bottom split pixel areas 3a and 3b. For example, each of the imaging lenses 42a and 42b has a body tube and one or more lens elements, for example, three lens elements, that are disposed therein.

The imaging optics 41 also consists of a partitioning plate 43 made of, for example, plastic. The partitioning plate 43 is painted matte-black that is capable of reflecting no light. The partitioning plate 43 has a substantially trapezoidal shape, and is so attached at its longitudinal base onto the boundary portion between the top and bottom split pixel areas 3a and 3b as to be orthogonal to the surface direction of the pixel area of the photodetector 3.

The first imaging lens 42a is supported by, for example, the case and located opposite the center of the top split pixel area 3a of the photodetector 3 and the partitioning plate 43.

Similarly, the second imaging lens 42b is supported by, for example, the case and located opposite the center of the bottom split pixel area 3b of the photodetector 3 and the partitioning plate 43 such that the first and second imaging lenses 42a and 42b are opposite to each other across the partitioning plate 43 along the vertical direction of the photodetector 3 orthogonal to the horizontal scan direction thereof.

In other words, the partitioning plate 43 is arranged to extend for vertically partitioning the top split pixel area 3a and the bottom split pixel area 3b at the boundary portion therebetween and for vertically partitioning the first imaging lens 42a and the second imaging lens 42b.

In other words, the partitioning plate 43 is arranged to partition an optical path between the top split pixel area 3a and the first imaging lens 42a and that between the bottom split pixel area 3b and the second imaging lens 42b.

The first imaging lens 42a is configured and arranged such that:

its first optical axis OX1a on the reading window side is inclined with respect to the surface direction of the pixel area of the photodetector 3 and to the normal line of the pixel area thereof substantially toward the center of one-half part of the reading window RW; and its second optical axis OX1b on the photodetector side is directed toward the center "a" of the top split pixel area 3a.

In other words, the first optical axis OX1a of the first imaging lens 42a is directed obliquely away from the center axis of the pixel area of the photodetector 3 toward the center of one-half part of the reading window RW. The second optical axis OX1b is three-dimensionally folded with respect to the first optical axis OX1a to be directed toward the center "a" of the top split pixel area 3a of the photodetector 3.

In addition, the second imaging lens 42b is configured and arranged such that:

its first optical axis OX2a on the reading window side is inclined with respect to the surface direction of the pixel area of the photodetector 3 and to the normal line of the pixel area thereof substantially toward the center of the other half part of the reading window RW; and its second optical axis OX2b on the photodetector side is directed toward the center "b" of the bottom split pixel area 3b.

In other words, the first optical axis OX2a of the second imaging lens 42b is directed obliquely away from the center axis of the pixel area of the photodetector 3 toward the center of the other-half part of the reading window RW. The second optical axis OX2b is three-dimensionally folded with respect to the first optical axis OX2a to be directed toward the center "b" of the bottom split pixel area 3b of the photodetector 3.

The arrangement of the first imaging lens 42a, the second imaging lens 42b, and the partitioning plate 43 allow a first FOV segment Va3 through the first imaging lens 42a and a second FOV segment Vb3 through the second imaging lens 42b to be:

defined outward through the reading window RW toward the target R when the optical information reader is located such that the reading window RW is closely opposite to the target R; and continuously aligned, with an overlap OV3, on the target R parallel to the longitudinal direction (horizontal direction) LD of the reading window RW (see FIGS. 13A and 13B).

Specifically, the configuration of the first imaging lens 42a allows light being reflected from the first FOV segment Va3 to be imaged on the top split pixel area 3a of the photodetector 3. Similarly, the configuration of the second imaging lens 42b allows light being reflected from the second FOV segment Vb3 to be imaged on the bottom split pixel area 3b of the photodetector 3.

The first and second FOV segments Va3 and Vb3 are continuously aligned, with the overlap OV3, parallel to the horizontal direction LD of the reading window RW with no gap in the vertical direction orthogonal to the horizontal direction LD. For this reason, the combination of the first and second FOV segments Va3 and Vb3 provides a horizontally-oriented FOV V3 in the horizontal direction LD parallel to the scan direction of the photodetector 3 (see FIG. 13A).

While the light being reflected from the first FOV segment Va3 is imaged on the top split pixel area 3a by the first imaging lens 42a and the light being reflected from the second FOV segment Vb3 is imaged on the bottom split pixel area 3b by the second imaging lens 42b, the partitioning plate 43 optically isolates the first and second imaging lenses 42a and 42b from each other. This prevents the first imaging lens 42a from providing an image on the bottom split pixel area 3b, and also prevents the second imaging lens 42b from providing an image on the top split pixel area 3a.

As described above, it is possible for the optical information reader according to the fifth embodiment to easily cover, in the horizontally-oriented FOV V3, horizontally-oriented items of optically readable information, such as barcodes having a relatively large length (width) across its bars and spaces, written on the target R and having a large amount of data. This allows the horizontally-oriented items to be easily read with high resolution.

In addition, in the fifth embodiment, the imaging optics 41 is composed of the pair of imaging lenses 42a and 42b and the partitioning plate 43. For this reason, it is possible to simply make up the imaging optics 41 at less cost as compared with a case of making up it using mirrors and/or prisms, which are comparatively expensive optical components.

Sixth Embodiment

An optical information reader according to a sixth embodiment of the present invention will be described hereinafter with reference to FIGS. 14A and 14B.

FIGS. 14A and 14B schematically illustrate part of a reading mechanism 44 of the optical information reader according to a sixth embodiment.

The reading mechanism 44 has a structure substantially identical to that of the reading mechanism 40 except for an imaging optics 45. For this reason, except for the imaging optics 45, like reference characters are assigned to like parts in the optical information readers according to the fifth and sixth embodiments so that descriptions of the parts of the optical information reader according to the sixth embodiment will be omitted or simplified.

The imaging optics 45 consists of a pair of first and second imaging lenses 46a and 46b as imaging optical elements, which respectively correspond to the top and bottom split pixel areas 3a and 3b of the photodetector 3. For example, each of the imaging lenses 46a and 46b has a body tube and one or more lens elements, for example, three lens elements.

The imaging optics 45 also consists of a partitioning plate 47 made of, for example, plastic. The partitioning plate 47 is painted matte-black that is capable of reflecting no light. Like the fifth embodiment, the partitioning plate 47 has a substantially trapezoidal shape, and is so attached at its longitudinal base onto the boundary portion between the top and bottom split pixel areas 3a and 3b as to be orthogonal to the surface direction of the pixel area of the photodetector 3.

The first imaging lens 46a is supported by, for example, the case and located in front of the partitioning plate 47. The second imaging lens 46b is supported by, for example, the case and located in front of the partitioning plate 47 such that:

the first and second imaging lenses 46a and 46b are opposite to each other along the horizontal scan direction of the photodetector 3; and its center axis is shifted from a center axis of the first imaging lens 46a in the vertical direction orthogonal to the horizontal scan direction.

The partitioning plate 47 is configured to extend for vertically partitioning the top split pixel area 3a and the bottom split pixel area 3b at the boundary portion therebetween.

The first imaging lens 46a is configured and arranged such that:

its first optical axis OX11a on the reading window side is inclined with respect to the surface direction of the pixel area of the photodetector 3 and to the normal line of the pixel area thereof substantially toward the center of one-half part of the reading window RW; and its second optical axis OX11b on the photodetector side is opposite to the top split pixel area 3a of the photodetector 3 and directed toward the center "a" of the top split pixel area 3a.

In other words, the first optical axis OX11a of the first imaging lens 46a is directed obliquely away from the center axis of the pixel area of the photodetector 3 toward the center of one-half part of the reading window RW. The second optical axis OX11b is three-dimensionally folded with respect to the first optical axis OX11a to be directed toward the center "a" of the top split pixel area 3a of the photodetector 3.

In addition, the second imaging lens 46b is configured and arranged such that:

its first optical axis OX12a on the reading window side is inclined with respect to the surface direction of the pixel area of the photodetector 3 and to the normal line of the pixel area thereof substantially toward the center of the other half part of the reading window RW; and its second optical axis OX12b on the photodetector side is opposite to the bottom split pixel area 3b of the photodetector 3 and directed toward the center "b" of the bottom split pixel area 3b.

In other words, the first optical axis OX12a of the second imaging lens 46b is directed obliquely away from the center axis of the pixel area of the photodetector 3 toward the center of the other-half part of the reading window RW. The second optical axis OX12b is three-dimensionally folded with respect to the first optical axis OX12a to be directed toward the center "b" of the bottom split pixel area 3b of the photodetector 3.

The arrangement of the first imaging lens 46a, the second imaging lens 46b, and the partitioning plate 47 allow a first FOV segment Va4 through the first imaging lens 46a and a second FOV segment Vb4 through the second imaging lens 46b to be:

defined outward through the reading window RW toward the target R when the optical information reader is located such that the reading window RW is closely opposite to the target R; and continuously aligned, with an overlap OV4, on the target R parallel to the longitudinal direction (horizontal direction) LD of the reading window RW (see FIGS. 14A and 14B).

Specifically, the configuration of the first imaging lens 46a allows light being reflected from the first FOV segment Va4 to be imaged on the top split pixel area 3a of the photodetector 3. Similarly, the configuration of the second imaging lens 46b allows light being reflected from the second FOV segment Vb4 to be imaged on the bottom split pixel area 3b of the photodetector 3.

The first and second FOV segments Va4 and Vb4 are continuously aligned, with the overlap OV4, parallel to the horizontal direction LD of the reading window RW with no gap in the vertical direction orthogonal to the horizontal direction LD. For this reason, the combination of the first and second FOV segments Va4 and Vb4 provides a horizontally-oriented FOV V4 in the horizontal direction LD parallel to the scan direction of the photodetector 3 (see FIG. 14A).

While the light being reflected from the first FOV segment Va4 is imaged on the top split pixel area 3a by the first imaging lens 46a and the light being reflected from the second FOV segment Vb4 is imaged on the bottom split pixel area 3b by the second imaging lens 46b, the partitioning plate 47 optically isolates the optical path between the first imaging lens 46a and the top split pixel area 3a from the optical path between the second imaging lens 46b and the bottom split pixel area 3b. This prevents the first imaging lens 46a from providing an image on the bottom split pixel area 3b, and also prevents the second imaging lens 46b from providing an image on the top split pixel area 3a.

As described above, it is possible for the optical information reader according to the sixth embodiment to easily cover, in the horizontally-oriented FOV V4, horizontally-oriented items of optically readable information, such as barcodes having a relatively large length (width) across its bars and spaces, written on the target R and having a large amount of data. This allows the horizontally-oriented items to be easily read with high resolution.

In addition, in the sixth embodiment, the imaging optics 45 is composed of the pair of imaging lenses 46a and 46b and the partitioning plate 47. For this reason, it is possible to simply make up the imaging optics 45 at less cost as compared with a case of making up it using mirrors and/or prisms, which are comparatively expensive optical components.

Seventh Embodiment

An optical information reader according to a seventh embodiment of the present invention will be described hereinafter with reference to FIGS. 15 and 16.

Figure 15:
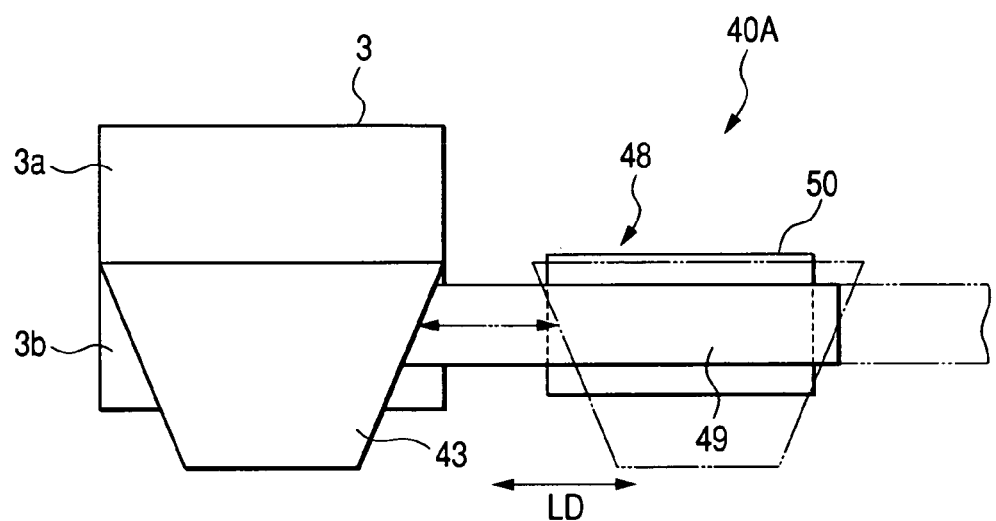
FIG. 15 is a view schematically illustrating part of a reading mechanism and a drive mechanism when it is viewed from the opposite side of a pixel area of a two-dimensional photodetector according to a seventh embodiment of the present invention.
Figure 16:
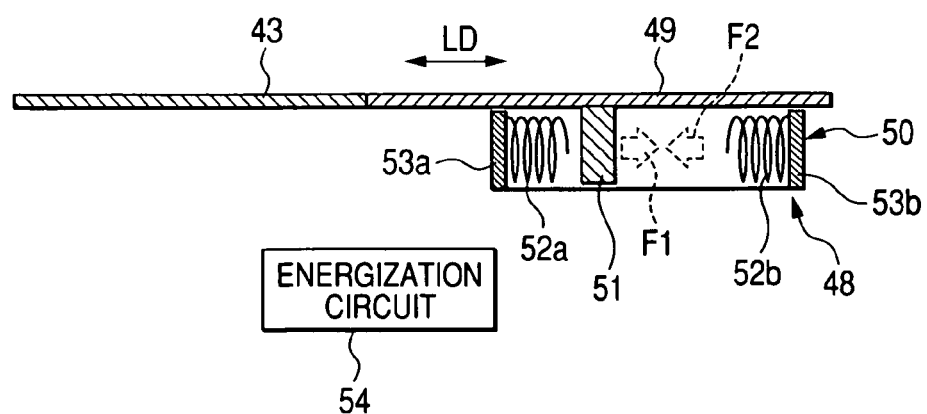
FIG. 16 is a cross sectional view of the drive mechanism illustrated in FIG. 15.

FIGS. 15 and 16 schematically illustrate part of a reading mechanism 40A of the optical information reader according to the seventh embodiment.

The reading mechanism 40A has a structure substantially identical to the structure of the reading mechanism 40.

The different point of the reading mechanism 40A from the reading mechanism 40 is that:

the partitioning plate 43 is movable along the boundary line between the top and bottom split pixel areas 3a and 3b, and the reading mechanism 40A further includes a drive mechanism 48 mechanically connected to the partitioning plate 43 and configured to move the partitioning plate 43 between a predetermined working position and a predetermined retracting position. The predetermined working position is a position at which the longitudinal base of the partitioning plate 43 is located onto the boundary portion between the top and bottom split pixel areas 3a and 3b. Note that, in FIGS. 15 and 16, the imaging lenses 42a and 42b are not shown to simplify the description of the drive mechanism 48.

The drive mechanism 48 is composed of an actuating lever 49 joined to one side wall of the partitioning plate 43. The actuating lever 49 extends from the joint portion with respect to the partitioning plate 43 along the horizontal direction LD of the reading window RW corresponding to the horizontal scan direction of the photodetector 3.

The drive mechanism 48 is also composed of a rectangular annular housing 50. The housing 50 is so supported by, for example, the case of the optical information reader as to be opposite to the actuating lever 49. The actuating lever 49 is movably supported by the housing 50 along the horizontal scan direction LD of the photodetector 3. The predetermined retracting position is a position at which the partitioning plate 43 is located on the housing 50 away from the photodetector 3.

As illustrated in FIG. 16, the drive mechanism 48 is composed of:

a magnet 51 fixed to one surface of the of the actuating lever 49 opposite the housing 50;

a pair of coils 52a and 52b installed in the housing 50 to be arranged close to the lateral walls thereof and opposite to each other across the magnet 51;

a pair of yokes 53a and 53b located between the lateral walls of the housing 50 and the pair of coils 52a and 52b, respectively; and an energization circuit 54 electrically connected to the control unit 12 and to the coils 52a and 52b and operative to energize the coils 52a and 52b.

As illustrated in FIG. 16, each of the coils 52a and 52b is wound around an axis parallel to the horizontal scan direction LD of the photodetector 3. A current flowing through the coils 52a and 52b by the energization circuit 54 allows a magnetic field to be produced in the axial direction parallel to the horizontal scan direction LD of the photodetector 3.

Specifically, in the drive mechanism 48, as need arises, such as a user operates one of the operating switches 6 to input an instruction to the control unit 12, the control unit 12 controls the energization circuit 54 to cause a current to flow in a predetermined polarity through each of the coils 52a and 52b. This allows creation of a magnetic field directed away from the photodetector 3 (see an arrow F1).

The magnetic field whose direction is represented by the arrow F1 allows the magnet 51 to move away from the photodetector 3 together with the actuating lever 49. The movement of the actuating lever 49 allows the partitioning plate 43 to move away from the photodetector 3 to be located at the retracting position on the case 50.

In addition, in a state that the partitioning plate 43 is located at the retracting position, as need arises, such as a user operates one of the operating switches 6 to input an instruction to the control unit 12, the control unit 12 controls the energization circuit 54 to cause a current whose polarity is reversed with respect to the predetermined polarity to flow through each of the coils 52a and 52b. This allows creation of a magnetic field directed close to the photodetector 3 (see an arrow F2).

The magnetic field whose direction is represented by the arrow F2 allows the magnet 51 to move close to the photodetector 3 together with the actuating lever 49. The movement of the actuating lever 49 allows the partitioning plate 43 to move close to the photodetector 3 to be located at the working position.

In other words, the user operates one of the operating switches 6 to control the control unit 12, thereby selectively locating the partitioning plate 43 to the working position or the retracting position.

As described above, in the seventh embodiment, when the partitioning plate 43 is located at the working position, it is possible for the optical information reader to easily cover, in the horizontally-oriented FOV V3, horizontally-oriented items of optically readable information, such as barcodes having a relatively large length across its bars and spaces, written on the target R. This allows the horizontally-oriented items to be easily read with high resolution.

In contrast, in the seventh embodiment, when the partitioning plate 43 is located at the retracting position, no partitioning plate is located between the first and second imaging lenses 42a and 42b. For this reason, it is possible for the optical information reader to pick up a composite image between an image of the target R through the first imaging lens 42a and that of the target R through the second imaging lens 42b by the whole pixel area of the photodetector 3. This is preferable to pick up a substantially cubic two-dimensional code.

In the seventh embodiment, the drive mechanism 48 automatically moves the actuating lever 49 together with the partitioning plate 43, thereby selectively locating the partitioning plate 43 to the working position or the retracting position. The present invention is however not limited to the structure.

Specifically, in the seventh embodiment, the partitioning plate 43 is movable along the boundary line between the working position and the retracting position, and the actuating lever 49 is movably supported by the housing 50 along the horizontal scan direction LD of the photodetector 3. For this reason, user's manual movement of the actuating lever 49 along the horizontal scan direction LD of the photodetector 3 allows the partitioning plate 43 to move between the working position and the retracting position.

In the seventh embodiment, the portioning plate 43 is movable along the boundary line between the top and bottom split pixel areas 3a and 3b, and the drive mechanism 48 is installed in the reading mechanism 40 of the optical information reader according to the fifth embodiment of the present invention. The present invention however is not limited to the structure. Specifically, the portioning plate 43 is movable along the boundary line between the top and bottom split pixel areas 3a and 3b, and the drive mechanism 48 can be installed in the reading mechanism 44 of the optical information reader according to the sixth embodiment. The modification can obtain the same effects described in the seventh embodiment set forth above.

Eighth Embodiment

An optical information reader according to an eighth embodiment of the present invention will be described hereinafter with reference to FIGS. 17A, 17B, and 18.

Figure 17A:
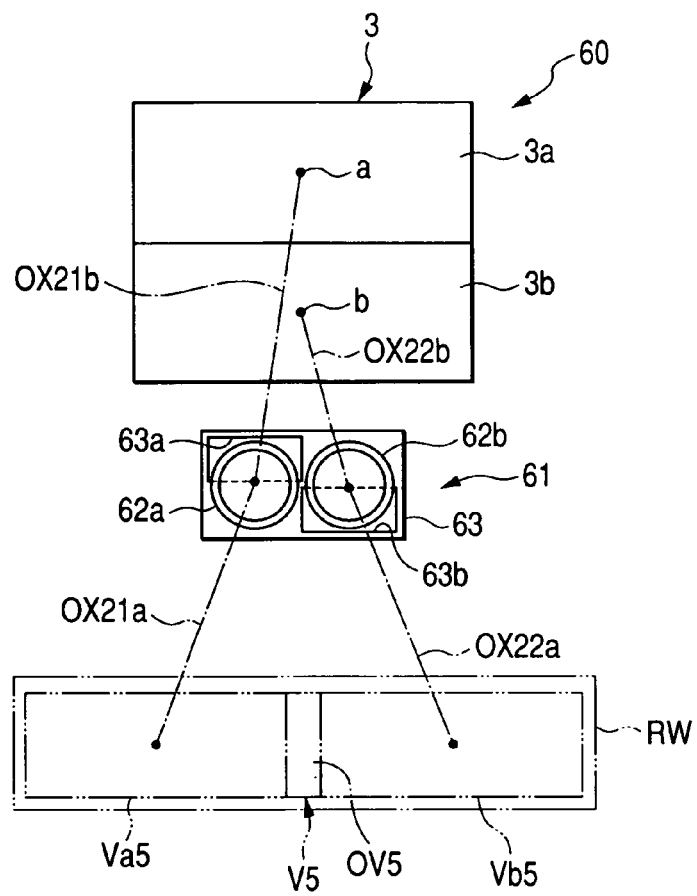
FIG. 17A is a view schematically illustrating part of a reading mechanism when it is viewed from the opposite side of a pixel area of a two-dimensional photodetector according to an eighth embodiment of the present invention.
Figure 17B:
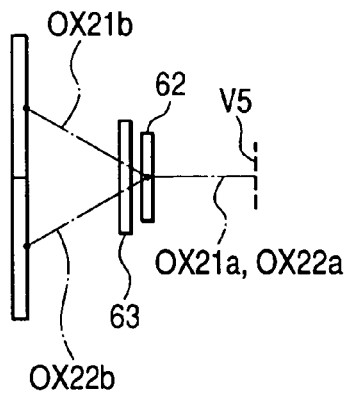
FIG. 17B is a schematic side view of the part of the reading mechanism illustrated in FIG. 17A.

FIGS. 17A and 17B schematically illustrate part of a reading mechanism 60 of the optical information reader according to the eighth embodiment.

The reading mechanism 60 has a structure substantially identical to that of the reading mechanism 40 except for an imaging optics 61. For this reason, except for the imaging optics 61, like reference characters are assigned to like parts in the optical information readers according to the fifth and eighth embodiments so that descriptions of the parts of the optical information reader according to the eighth embodiment will be omitted or simplified.

The imaging optics 61 consists of a pair of first and second imaging lenses 62a and 62b as imaging optical elements, which respectively correspond to the top and bottom split pixel areas 3a and 3b of the photodetector 3.

Each of the first and second imaging lenses 62a and 62b has, for example, a substantially circular discoid shape.

The first and second imaging lenses 62a and 62b are supported by, for example, the case and substantially aligned with each other along the boundary line between the top and bottom split pixel areas 3a and 3b such that their one surface walls parallely face the boundary portion of the pixel area of the photodetector 3 across a partially shielding plate described hereinafter.

The first imaging lens 62a is configured and arranged such that:

its first optical axis OX21a on the reading window side is inclined with respect to the surface direction of the pixel area of the photodetector 3 and to the normal line of the pixel area thereof substantially toward the center of one-half part of the reading window RW; and its second optical axis OX21b on the photodetector side is directed toward the center "a" of the top split pixel area 3a.

In other words, the first optical axis OX21a of the first imaging lens 62a is directed obliquely away from the center axis of the pixel area of the photodetector 3 toward the center of one-half part of the reading window RW. The second optical axis OX21b is three-dimensionally folded with respect to the first optical axis OX21a to be directed toward the center "a" of the top split pixel area 3a of the photodetector 3.

In addition, the second imaging lens 62b is configured and arranged such that:

its first optical axis OX22a on the reading window side is inclined with respect to the surface direction of the pixel area of the photodetector 3 and to the normal line of the pixel area thereof substantially toward the center of the other half part of the reading window RW; and its second optical axis OX22b on the photodetector side is directed toward the center "b" of the bottom split pixel area 3b.

In other words, the first optical axis OX22a of the second imaging lens 62b is directed obliquely away from the center axis of the pixel area of the photodetector 3 toward the center of the other-half part of the reading window RW. The second optical axis OX22b is three-dimensionally folded with respect to the first optical axis OX22a to be directed toward the center "b" of the bottom split pixel area 3b of the photodetector 3.

Figure 18:
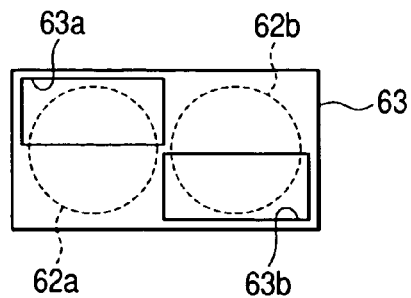
FIG. 18 is a view schematically illustrating the structure of a partially shielding plate illustrated in FIG. 17A.

In addition, as illustrated in FIG. 18, the imaging optics 61 consists of a partially shielding plate 63 having a substantially rectangular plate-like shape and made of, for example, plastic. The partially shielding plate 63 is painted matte-black that is capable of reflecting no light. The partially shielding plate 63 is so arranged between the pixel area of the photodetector 3 and the first and second imaging lenses 62a and 62b to be parallely opposite closely to the one surface walls of the lenses 62a and 62b.

The partially shielding plate 63 is formed at its part with a first rectangular slit 63a, and at its another part with a second rectangular slit 63b. The first slit 63a is arranged to be closely opposite to one half part of the first imaging lens 62a in the vertical direction; this one half part of the first imaging lens 62a faces the top pixel area 3a of the photodetector 3. Similarly, the second slit 63b is arranged to be closely opposite to one half part of the second imaging lens 62b in the vertical direction; this one half part of the second imaging lens 62b faces the bottom pixel area 3b of the photodetector 3.

In other words, the partially shielding plate 63 is configured to shield the other half part of an FOV of the first imaging lens 62a opposite to the bottom pixel area 3b of the photodetector 3, and also shield the other half part of an FOV of the second imaging lens 62b opposite to the top pixel area 3a of the photodetector 3.

The arrangement of the first imaging lens 62a, the second imaging lens 62b, and the partially shielding plate 63 with the first and second slits 63a and 63b allow a first FOV segment Va5 through the first imaging lens 62a and a second FOV segment Vb5 through the second imaging lens 62b to be:

defined outward through the reading window RW toward the target R when the optical information reader is located such that the reading window RW is closely opposite to the target R; and continuously aligned, with an overlap OV5, on the target R parallel to the longitudinal direction (horizontal direction) LD of the reading window RW (see FIGS. 17A and 17B).

Specifically, the first imaging lens 62a and the first slit 63a allow light being reflected from the first FOV segment Va5 to be imaged on the top split pixel area 3a of the photodetector 3. The partially shield plate 63 can prevent the light being reflected from the first FOV segment Va5 from entering into the bottom split pixel area 3b of the photodetector 3.

Similarly, the second imaging lens 62b and the second slit 63b allow light being reflected from the second FOV segment Vb5 to be imaged on the bottom split pixel area 3b of the photodetector 3. The partially shield plate 63 can prevent the light being reflected from the second FOV segment Vb5 from entering into the top split pixel area 3a of the photodetector 3.

The first and second FOV segments Va5 and Vb5 are continuously aligned, with the overlap OV5, parallel to the horizontal direction LD of the reading window RW with no gap in the vertical direction orthogonal to the horizontal direction LD. For this reason, the combination of the first and second FOV segments Va5 and Vb5 provides a horizontally-oriented FOV V5 in the horizontal direction LD parallel to the scan direction of the photodetector 3 (see FIG. 17A).

As described above, like the fifth embodiment, it is possible for the optical information reader according to the eighth embodiment to easily cover, in the horizontally-oriented FOV V5, horizontally-oriented items of optically readable information, such as barcodes having a relatively large length (width) across its bars and spaces, written on the target R and having a large amount of data. This allows the horizontally-oriented items to be easily read with high resolution.

In addition, in the eighth embodiment, the imaging optics 61 is composed of the pair of imaging lenses 62a and 62b and the partially shielding plate 63. For this reason, it is possible to simply make up the imaging optics 61 at less cost as compared with a case of making up it using mirrors and/or prisms, which are comparatively expensive optical components.

Note that, in the eighth embodiment, the partially shielding plate 63 is arranged between the pixel area of the photodetector 3 and the first and second imaging lenses 62a and 62b. The partially shielding plate 63 can be arranged between the first and second imaging lenses 62a and 62b and the reading window RW to be parallely opposite closely to the other surface walls of the lenses 62a and 62b.

Ninth Embodiment

An optical information reader according to a ninth embodiment of the present invention will be described hereinafter with reference to FIGS. 19 and 20.

Figure 19:
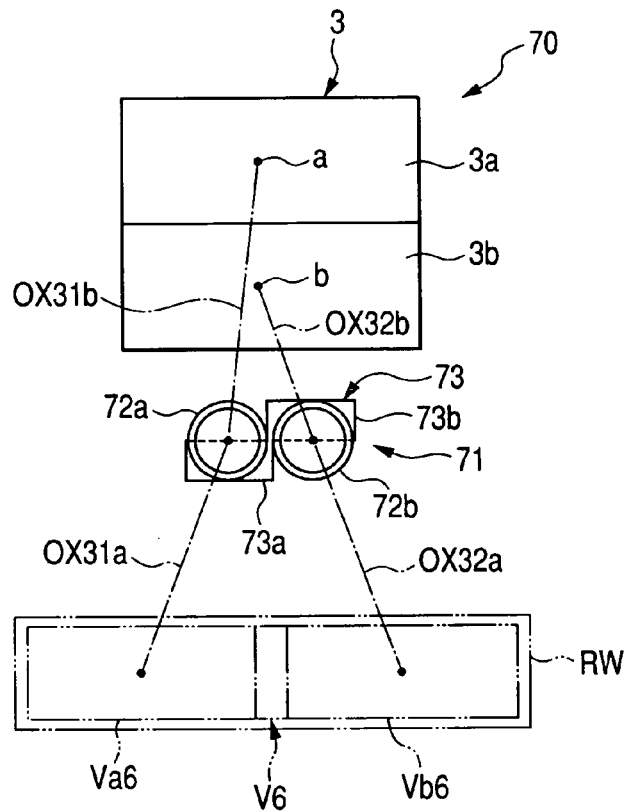
FIG. 19 is a view schematically illustrating part of a reading mechanism when it is viewed from the opposite side of a pixel area of a two-dimensional photodetector according to a ninth embodiment of the present invention.

FIG. 19 schematically illustrates part of a reading mechanism 70 of the optical information reader according to the ninth embodiment.

The reading mechanism 70 has a structure substantially identical to the structure of the reading mechanism 60 except for an imaging optics 71. For this reason, except for the imaging optics 71, like reference characters are assigned to like parts in the optical information readers according to the eighth and ninth embodiments so that descriptions of the parts of the optical information reader according to the ninth embodiment will be omitted or simplified.

The imaging optics 71 consists of a pair of first and second imaging lenses 72a and 72b as imaging optical elements, which respectively correspond to the top and bottom split pixel areas 3a and 3b of the photodetector 3.

Each of the first and second imaging lenses 72a and 72b has a substantially circular discoid shape.

The first and second imaging lenses 72a and 72b are supported by, for example, the case and substantially aligned with each other along the boundary line between the top and bottom split pixel areas 3a and 3b such that their one surface walls parallely face the boundary portion of the pixel area of the photodetector 3 across a partially shielding plate described hereinafter.

The first imaging lens 72a is configured and arranged such that:

its first optical axis OX31a on the reading window side is inclined with respect to the surface direction of the pixel area of the photodetector 3 and to the normal line of the pixel area thereof substantially toward the center of one-half part of the reading window RW; and its second optical axis OX31b on the photodetector side is directed toward the center "a" of the top split pixel area 3a.

In other words, the first optical axis OX31a of the first imaging lens 72a is directed obliquely away from the center axis of the pixel area of the photodetector 3 toward the center of one-half part of the reading window RW. The second optical axis OX31b is three-dimensionally folded with respect to the first optical axis OX31a to be directed toward the center "a" of the top split pixel area 3a of the photodetector 3.

In addition, the second imaging lens 72b is configured and arranged such that:

its first optical axis OX32a on the reading window side is inclined with respect to the surface direction of the pixel area of the photodetector 3 and to the normal line of the pixel area thereof substantially toward the center of the other half part of the reading window RW; and its second optical axis OX32b on the photodetector side is directed toward the center "b" of the bottom split pixel area 3b.

In other words, the first optical axis OX32a of the second imaging lens 72b is directed obliquely away from the center axis of the pixel area of the photodetector 3 toward the center of the other-half part of the reading window RW. The second optical axis OX32b is three-dimensionally folded with respect to the first optical axis OX32a to be directed toward the center "b" of the bottom split pixel area 3b of the photodetector 3.

Figure 20:
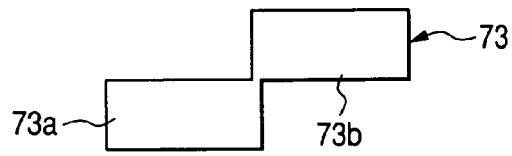
FIG. 20 is a view schematically illustrating the structure of a partially shielding plate illustrated in FIG. 19.

In addition, as illustrated in FIG. 20, the imaging optics 71 consists of a partially shielding plate 73 having a substantially combination of a first rectangular plate member 73a and a second rectangular plate member 73b. The partially shielding plate 73 is made of, for example, plastic, and is painted matte-black that is capable of reflecting no light.

The partially shielding plate 73 is so arranged between the pixel area of the photodetector 3 and the first and second imaging lenses 72a and 72b as to be parallely opposite closely to the one surface walls of the lenses 72a and 72b.

Specifically, the first rectangular plate member 73a is arranged to be closely opposite to one half part of the first imaging lens 72a in the vertical direction; this one half part of the first imaging lens 72a faces the bottom pixel area 3b of the photodetector 3. Similarly, the second rectangular plate member 73b is arranged to be closely opposite to one-half part of the second imaging lens 72b in the vertical direction; this one-half part of the second imaging lens 72b faces the top pixel area 3a of the photodetector 3.

In other words, the first rectangular plate member 73a is configured to shield the one-half part of an FOV of the first imaging lens 72a opposite to the bottom pixel area 3b of the photodetector 3. Similarly, the second rectangular plate member 73b is configured to shield the one-half part of an FOV of the second imaging lens 72b opposite to the top pixel area 3a of the photodetector 3.

The arrangement of the first imaging lens 72a, the second imaging lens 72b, and the partially shielding plate 73 consisting of the first and second rectangular plate members 73a and 73b allows a first FOV segment Va6 through the first imaging lens 72a and a second FOV segment Vb6 through the second imaging lens 72b to be:

defined outward through the reading window RW toward the target R when the optical information reader is located such that the reading window RW is closely opposite to the target R; and continuously aligned, with an overlap OV6, on the target R parallel to the longitudinal direction (horizontal direction) LD of the reading window RW (see FIG. 19).

Specifically, the first imaging lens 72a allows light being reflected from the first FOV segment Va6 to be imaged on the top split pixel area 3a of the photodetector 3. The first rectangular plate member 73a of the partially shield plate 73 can prevent the light being reflected from the first FOV segment Va6 from entering into the bottom split pixel area 3b of the photodetector 3.

Similarly, the second imaging lens 72b allows light being reflected from the second FOV segment Vb6 to be imaged on the bottom split pixel area 3b of the photodetector 3. The second rectangular plate member 73b of the partially shield plate 73 can prevent the light being reflected from the second FOV segment Vb6 from entering into the top split pixel area 3a of the photodetector 3.

The first and second FOV segments Va6 and Vb6 are continuously aligned, with the overlap OV6, parallel to the horizontal direction LD of the reading window RW with no gap in the vertical direction orthogonal to the horizontal direction LD. For this reason, the combination of the first and second FOV segments Va6 and Vb6 provides a horizontally-oriented FOV V6 in the horizontal direction LD parallel to the scan direction of the photodetector 3 (see FIG. 19).

As described above, like the eighth embodiment, it is possible for the optical information reader according to the ninth embodiment to easily cover, in the horizontally-oriented FOV V6, horizontally-oriented items of optically readable information, such as barcodes having a relatively large length (width) across its bars and spaces, written on the target R and having a large amount of data. This allows the horizontally-oriented items to be easily read with high resolution.

In addition, in the ninth embodiment, the imaging optics 71 is composed of the pair of imaging lenses 72a and 72b and the partially shielding plate 73. For this reason, it is possible to simply make up the imaging optics 71 at less cost as compared with a case of making up it using mirrors and/or prisms, which are comparatively expensive optical components.

Note that, in the ninth embodiment, the partially shielding plate 73 is arranged between the pixel area of the photodetector 3 and the first and second imaging lenses 72a and 72b. The partially shielding plate 73 can be arranged between the first and second imaging lenses 72a and 72b and the reading window RW to be parallely opposite closely to the other surface walls of the lenses 72a and 72b.

Tenth Embodiment

An optical information reader according to a tenth embodiment of the present invention will be described hereinafter with reference to FIG. 21.

Figure 21:
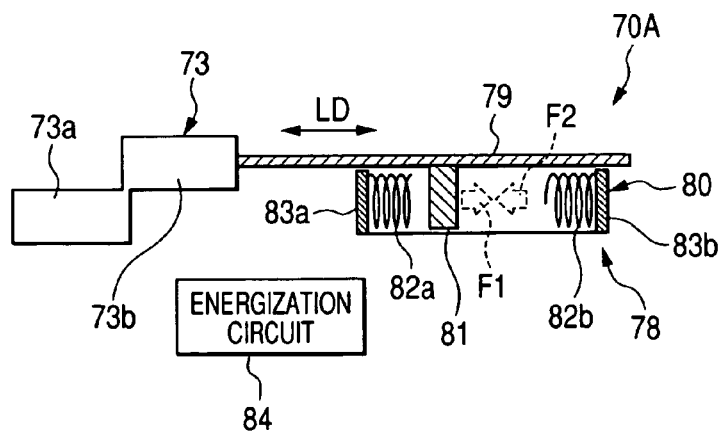
FIG. 21 is a cross sectional view of part of a reading mechanism of an optical information reader according to a tenth embodiment of the present invention.

FIG. 21 schematically illustrates part of a reading mechanism 70A of the optical information reader according to the tenth embodiment.

The reading mechanism 70A has a structure substantially identical to the structure of the reading mechanism 70.

The different point of the reading mechanism 70A from the reading mechanism 70 is that:

the partially shielding plate 73 is movable along the boundary line between the top and bottom split pixel areas 3a and 3b, and the reading mechanism 70A further includes a drive mechanism 78 mechanically connected to the partially shielding plate 73 and configured to move the partially shielding plate 73 between a predetermined working position and a predetermined retracting position. The predetermined working position is a position at which the first and second rectangular plate members 73a and 73b are opposite closely to the first and second imaging lenses 72a and 72b, respectively. Note that, in FIG. 21, the photodetector 3 and the imaging lenses 42a and 42b are not shown to simplify the description of the drive mechanism 78.

As well as the drive mechanism 48, the drive mechanism 78 is composed of an actuating lever 79 joined to one side wall of the partially shielding plate 73. The actuating lever 79 extends from the joint portion with respect to the partially shielding plate 73 along the horizontal direction LD of the reading window RW corresponding to the horizontal scan direction of the photodetector 3.

The drive mechanism 78 is also composed of a rectangular annular housing 80. The housing 80 is so supported by, for example, the case of the optical information reader as to be opposite to the actuating lever 79. The actuating lever 79 is movably supported by the housing 80 along the horizontal scan direction LD of the photodetector 3. The predetermined retracting position is a position at which the partially shielding plate 73 is located on the housing 80 away from the photodetector 3.

As illustrated in FIG. 21, the drive mechanism 78 is composed of:

a magnet 81 fixed to one surface of the of the actuating lever 79 opposite the housing 80;

a pair of coils 82a and 82b installed in the housing 80 to be arranged close to the lateral walls thereof and opposite to each other across the magnet 81;

a pair of yokes 83a and 83b located between the lateral walls of the housing 80 and the pair of coils 82a and 82b, respectively; and an energization circuit 84 electrically connected to the control unit 12 and to the coils 82a and 82b and operative to energize the coils 82a and 82b.

As illustrated in FIG. 21, each of the coils 82a and 82b is wound around an axis parallel to the horizontal scan direction LD of the photodetector 3. A current flowing through the coils 82a and 82b by the energization circuit 84 allows a magnetic field to be produced in the axial direction parallel to the horizontal scan direction LD of the photodetector 3.

Specifically, in the drive mechanism 78, as need arises, such as a user operates one of the operating switches 6 to input an instruction to the control unit 12, the control unit 12 controls the energization circuit 84 to cause a current to flow in a predetermined polarity through each of the coils 82a and 82b.

This allows creation of a magnetic field directed away from the photodetector 3 (see an arrow F1).

The magnetic field whose direction is represented by the arrow F1 allows the magnet 81 to move away from the photodetector 3 together with the actuating lever 79. The movement of the actuating lever 79 allows the partially shielding plate 73 to move away from the photodetector 3 to be located at the retracting position on the case 80.

In addition, in a state that the partially shielding plate 73 is located at the retracting position, as need arises, such as a user operates one of the operating switches 6 to input an instruction to the control unit 12, the control unit 12 controls the energization circuit 84 to cause a current whose polarity is reversed with respect to the predetermined polarity to flow through each of the coils 82*a* and 82*b*. This allows creation of a magnetic field directed close to the photodetector 3 (see an arrow F2).

The magnetic field whose direction is represented by the arrow F2 allows the magnet 81 to move close to the photodetector 3 together with the actuating lever 79. The movement of the actuating lever 79 allows the partially shielding plate 73 to move close to the photodetector 3 to be located at the working position.

In other words, the user operates one of the operating switches 6 to control the control unit 12, thereby selectively locating the partially shielding plate 73 to the working position or the retracting position.

As described above, in the tenth embodiment, when the partially shielding plate 73 is located at the working position, it is possible for the optical information reader to easily cover, in the horizontally-oriented FOV V6, horizontally-oriented items of optically readable information, such as barcodes having a relatively large length across its bars and spaces, written on the target R. This allows the horizontally-oriented items to be easily read with high resolution.

In contrast, in the tenth embodiment, when the partially positioning plate 73 is located at the retracting position, no partially shielding plate is located between the first and second imaging lenses 72*a* and 72*b*. For this reason, it is possible for the optical information reader to pick up a composite image between an image of the target R through the first imaging lens 72*a* and that of the target R through the second imaging lens 72*b* by the whole pixel area of the photodetector 3. This is preferable to pick up a substantially cubic two-dimensional code.

In the tenth embodiment, the drive mechanism 78 automatically moves the actuating lever 79 together with the partially shielding plate 73, thereby selectively locating the partially shielding plate 73 to the working position or the retracting position. The present invention is however not limited to the structure.

Specifically, in the tenth embodiment, the partially shielding plate 73 is movable along the boundary line between the working position and the retracting position, and the actuating lever 79 is movably supported by the housing 80 along the horizontal scan direction LD of the photodetector 3. For this reason, user's manual movement of the actuating lever 79 along the horizontal scan direction LD of the photodetector 3 allows the partially shielding plate 73 to move between the working position and the retracting position.

In the tenth embodiment, the partially positioning plate 73 is movable along the boundary line between the top and bottom split pixel areas 3*a* and 3*b*, and the drive mechanism 78 is installed in the reading mechanism 70 of the optical information reader according to the ninth embodiment of the present invention. The present invention however is not limited to the structure. Specifically, the partially positioning plate 63 is movable along the boundary line between the top and bottom split pixel areas 3*a* and 3*b*, and the drive mechanism 78 can be installed in the reading mechanism 60 of the optical information reader according to the eighth embodiment. The modification can obtain the same effects described in the tenth embodiment set forth above.

Eleventh Embodiment

An optical information reader according to an eleventh embodiment of the present invention will be described hereinafter with reference to FIGS. 22, 23A, 23B, 24A, 24B, 25A, and 25B.

Figure 22:
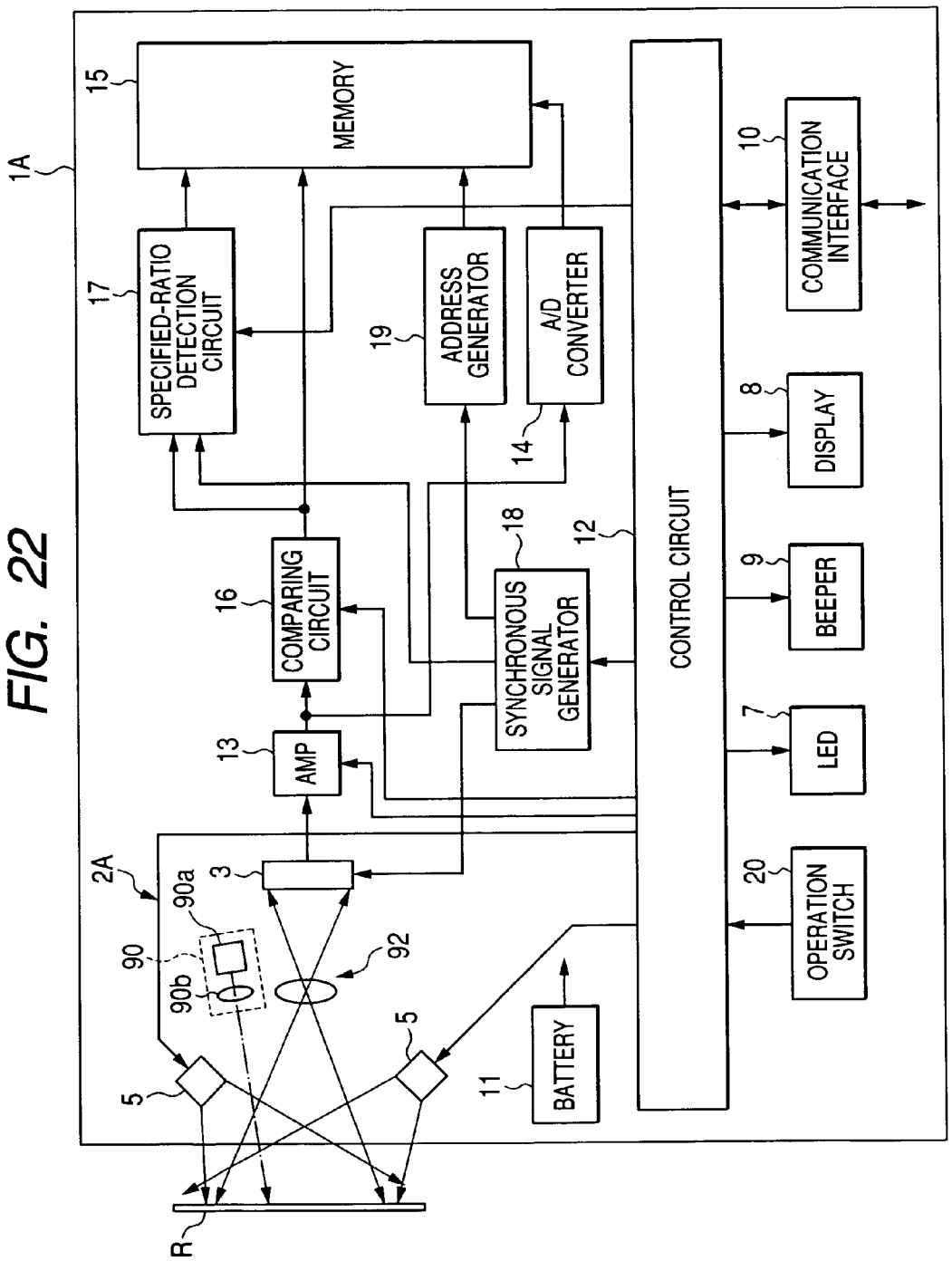
FIG. 22 is a block diagram schematically illustrating an example of the electric structure of an optical information reader according to an eleventh embodiment of the present invention.

As illustrated in FIG. 22, a reading mechanism 2A of the optical information reader 1A according to the eleventh embodiment further includes a marker beam irradiating device 90. The marker beam irradiating device 90 is operative to mark the location of a reading position (picking up area) of the optical information reader 1A, such as the center of a horizontally-oriented FOV V7 of the optical information reader 1A, which will be described hereinafter.

The marker beam irradiating device 90 consists of a laser diode 90*a* as light source for emitting a laser beam, and a plastic collective lens 90*b* disposed at the light emitting side of the laser diode 90*a* and coaxially aligned therewith. Specifically, the laser beam emitted from the laser diode 90*a* is collected by the collective lens 90*b* to be focused (irradiated) as a spot beam onto the target R; this spot beam shows the location of the reading position (picking-up area) of the optical information reader 1A. In place of the collective lens 90*b*, a diffractive grating can be used.

Figure 23A:
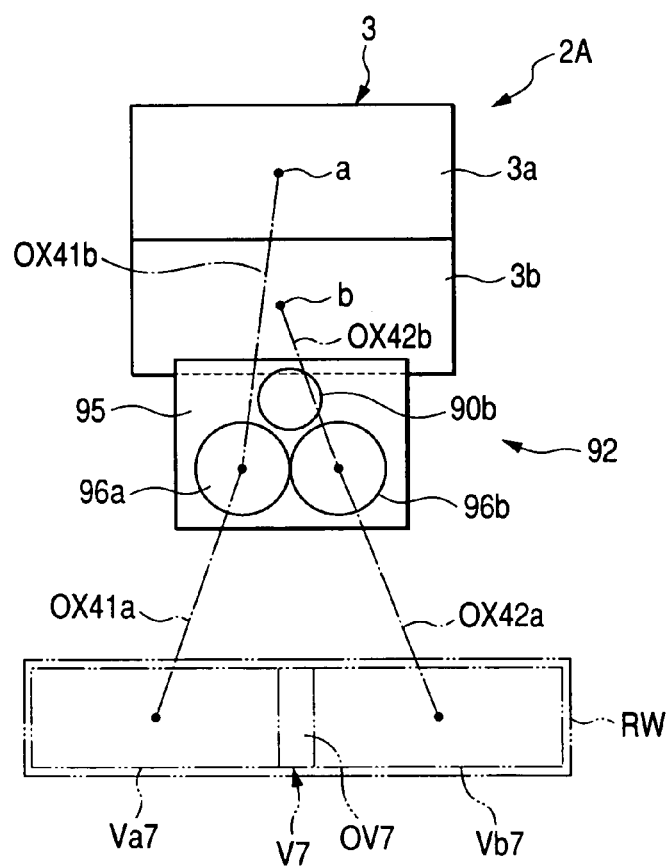
FIG. 23A is a view schematically illustrating part of a reading mechanism when it is viewed from the opposite side of a pixel area of a two-dimensional photodetector according to the eleventh embodiment.
Figure 23B:
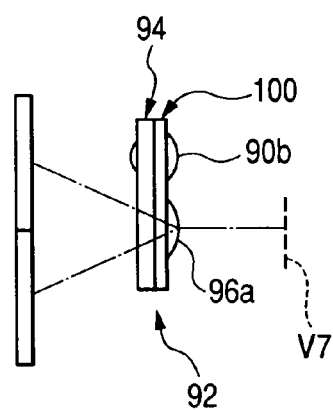
FIG. 23B is a schematic side view of the part of the reading mechanism illustrated in FIG. 23A.

In addition, FIGS. 23A and 23B schematically illustrate part of the reading mechanism 2A of the optical information reader 1A according to the eleventh embodiment.

The reading mechanism 2A has a structure substantially identical to that of the reading mechanism 40 except for an imaging optics 92. For this reason, except for the imaging optics 92, like reference characters are assigned to like parts in the optical information readers according to the fifth and eleventh embodiments so that descriptions of the parts of the optical information reader according to the eleventh embodiment will be omitted or simplified.

The imaging optics 92 is supported by, for example, the case of the optical information reader 1A.

The imaging optics 92 includes a lens unit 94 having a substantially rectangular plate-like shape as a whole.

Figure 24A:
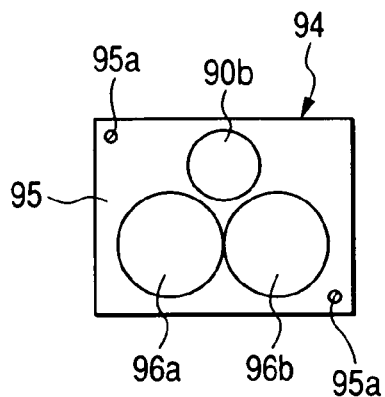
FIG. 24A is a view schematically illustrating the structure of a lens unit illustrated in FIG. 23B.
Figure 24B:
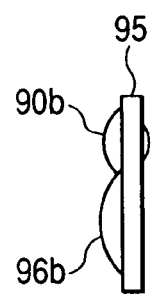
FIG. 24B is a schematic side view of the lens unit illustrated in FIG. 24A.

Specifically, as illustrated in FIGS. 24A and 24B, the lens unit 94 consists of:

a plastic frame 95 having a thin width and a substantially rectangular outside shape;

a pair of first and second imaging lenses 96*a* and 96*b* integrated into the frame 95 and coupled to each other, which respectively correspond to the top and bottom split pixel areas 3*a* and 3*b* of the photodetector 3; and the collective lens 90*b* integrated into the frame 95 and coupled to the first and second imaging lenses 96*a* and 96*b*.

The lens unit 94 is arranged between the photodetector 3 and the reading window RW such that the first and second imaging lenses 96*a* and 96*b* are substantially aligned along the boundary line between the top and bottom split pixel areas 3*a* and 3*b*.

The first imaging lens 96*a* is configured and arranged such that:

its first optical axis OX41*a* on the reading window side is inclined with respect to the surface direction of the pixel area of the photodetector 3 and to the normal line of the pixel area thereof substantially toward the center of one-half part of the reading window RW; and its second optical axis OX41b on the photodetector side is directed toward the center "a" of the top split pixel area 3a.

In other words, the first optical axis OX41a of the first imaging lens 96a is directed obliquely away from the center axis of the pixel area of the photodetector 3 toward the center of one-half part of the reading window RW. The second optical axis OX41b is three-dimensionally folded with respect to the first optical axis OX41a to be directed toward the center "a" of the top split pixel area 3a of the photodetector 3.

In addition, the second imaging lens 96b is configured and arranged such that:

its first optical axis OX42a on the reading window side is inclined with respect to the surface direction of the pixel area of the photodetector 3 and to the normal line of the pixel area thereof substantially toward the center of the other half part of the reading window RW; and its second optical axis OX42b on the photodetector side is directed toward the center "b" of the bottom split pixel area 3b.

In other words, the first optical axis OX42a of the second imaging lens 96b is directed obliquely away from the center axis of the pixel area of the photodetector 3 toward the center of the other-half part of the reading window RW. The second optical axis OX42b is three-dimensionally folded with respect to the first optical axis OX42a to be directed toward the center "b" of the bottom split pixel area 3b of the photodetector 3.

The collective lens 90b is arranged opposite the top pixel area 3a of the photodetector 3 on the upper side of the first and second imaging lenses 96a and 96b in the vertical direction.

The frame 95 is formed with mounting holes 95a respectively located at its one paired corner portions diagonal to each other. The frame 95 is configured to intermediate among the first and second imaging lenses 96a and 96b and the collective lens 90b arranged set forth above for joining them.

For example, the frame 95, the first and second imaging lenses 96a and 96b, and the collective lens 90b are formed in one piece of plastic.

In addition, the imaging optics 92 includes a light shielding cover 100 having a substantially rectangular plate-like shape as a whole corresponding to the shape of the frame 95 of the lens unit 94. The light shielding cover 100 is made of, for example, plastic, and is painted matte-black that is capable of reflecting no light.

As illustrated in FIG. 23B, the light shielding cover 100 is attached to one surface-wall of the frame 95 facing the reading window RW.

Figure 25A:
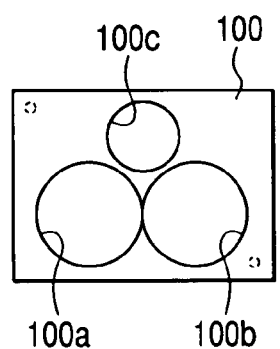
FIG. 25A is a view schematically illustrating the structure of a light shielding cover illustrated in FIG. 23B.
Figure 25B:
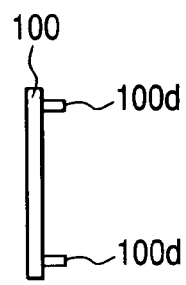
FIG. 25B is a schematic side view of the light shielding cover illustrated in FIG. 25A.

Specifically, as illustrated in FIGS. 25A and 25B, the light shielding cover 100 is formed with three openings 100a, 100b, and 100c to match the first imaging lens 96a, the second imaging lens 96b, and the collective lens 90b, respectively.

The light shielding cover 100 is also formed at its one surface-wall opposite the one surface-wall of the frame 95 with mounting pins 100d respectively located at its one paired corner portions of the one surface-wall thereof diagonal to each other.

Specifically, the light shielding cover 100 is attached to one surface-wall of the frame 95 such that:

the mounting pins 100d are inserted respectively into the mounting holes 95a; and the first imaging lens 96a, the second imaging lens 96b, and the collective lens 90b are fitted into the three openings 100a, 100b, and 100c, respectively.

The light shielding cover 100 works to optically isolate the first imaging lens 96a, the second imaging lens 96b, and the collective lens 90b from each other. This can prevent light passing through one of the lenses 96a, 96b, and 90b from interfering with light passing through another one of the lenses 96a, 96b, and 90b.

The arrangement of the first imaging lens 96a, the second imaging lens 96b, and the light shielding cover 100 allows a first FOV segment Va7 through the first imaging lens 96a and a second FOV segment Vb7 through the second imaging lens 96b to be:

defined outward through the reading window RW toward the target R when the optical information reader is located such that the reading window RW is closely opposite to the target R; and continuously aligned, with an overlap OV7, on the target R parallel to the longitudinal direction (horizontal direction) LD of the reading window RW (see FIG. 23A).

Specifically, the first imaging lens 96a allows light being reflected from the first FOV segment Va7 to be imaged on the top split pixel area 3a of the photodetector 3. Similarly, the second imaging lens 96b allows light being reflected from the second FOV segment Vb7 to be imaged on the bottom split pixel area 3b of the photodetector 3.

The first and second FOV segments Va7 and Vb7 are continuously aligned, with the overlap OV7, parallel to the horizontal direction LD of the reading window RW with no gap in the vertical direction orthogonal to the horizontal direction LD. For this reason, the combination of the first and second FOV segments Va7 and Vb7 provides a horizontally-oriented FOV V7 in the horizontal direction LD parallel to the scan direction of the photodetector 3 (see FIG. 23A).

As described above, like the fifth embodiment, it is possible for the optical information reader according to the eleventh embodiment to easily cover, in the horizontally-oriented FOV V7, horizontally-oriented items of optically readable information, such as barcodes having a relatively large length (width) across its bars and spaces, written on the target R and having a large amount of data. This allows the horizontally-oriented items to be easily read with high resolution.

Moreover, in the eleventh embodiment, the first and second imaging lenses 96a and 96b are integrated with each other as the lens unit 94. For this reason, it is possible to:

reduce the number of components of the reading mechanism 2A;

simplify the structure of the reading mechanism 2A;

save space in the case of the optical information reader 1A; and simplify installation of the reading mechanism 2A in the case of the optical information reader 1A.

Furthermore, in the eleventh embodiment, the collective lens 90b of the marker beam irradiating device 90 for collecting the laser beam emitted from the laser diode 90a is also integrated with the lens unit 94. This allows the structure of the reading mechanism 2A to be more simplified.

Twelfth Embodiment

Figure 26A:
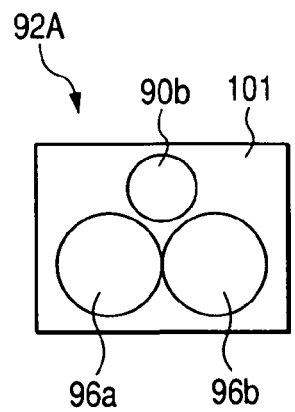
FIG. 26A is a view schematically illustrating the structure of a combination of a lens unit and a light shielding cover according to a twelfth embodiment of the present invention.
Figure 26B:
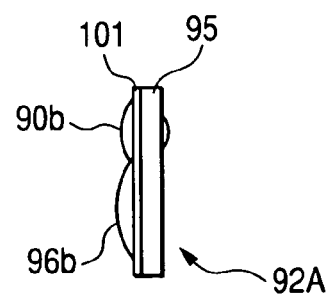
FIG. 26B is a schematic side view of the combination of the lens unit and the light shielding cover illustrated in FIG. 26A.

An optical information reader according to a twelfth embodiment of the present invention will be described hereinafter with reference to FIGS. 26A and 26B.

The different point of the optical information reader according to the twelfth embodiment from that according to the eleventh embodiment is the structure of an imaging optics 92A. For this reason, like reference characters are assigned to like parts in the optical information readers according to the eleventh and twelfth embodiments so that descriptions of the parts of the optical information reader according to the twelfth embodiment will be omitted.

Specifically, the imaging optics 92A includes the lens unit 94 and a light shielding cover 101 having a substantially rectangular plate-like shape as a whole corresponding to the shape of the frame 95 of the lens unit 94. The light shielding cover 101 is made of, for example, plastic, and is painted matte-black that is capable of reflecting no light.

In the twelfth embodiment, the lens unit 94 and the light shielding cover 101 are formed in one piece using coinjection molding.

Specifically, first, the frame 95, the first and second imaging lenses 96a and 96b, and the collective lens 90b are formed in one piece of transparent plastic.

Thereafter, the light shielding cover 101 is formed at the one surface-wall of the frame 95 in one piece of plastic containing a black pigment.

According to the twelfth embodiment, because the light shielding plate 101 is integrated with the lens unit 94 to form the imaging optics 92A, it is possible to further reduce the number of components of the imaging optics 92A, thereby more simplifying the structure of the imaging optics 92A.

Note that, in the eleventh embodiment and twelfth embodiment, the collective lens 90b is integrated with the lens unit 94, but the collective lens 90b can be separated from the lens unit 94.

In addition, in each of the eleventh embodiment and twelfth embodiment, the light shielding cover 100 (101) is attached to the one surface-wall of the frame 95 facing the reading window RW. The light shielding cover 100 (101) can be attached to the other surface-wall of the frame 95 facing the pixel area of the photodetector 3.

Moreover, in each of the eleventh embodiment and twelfth embodiment, in place of the light shielding cover 100 (101), a partitioning plate described in any one of the fifth to seventh embodiments can be disposed to the other surface-wall side of the lens unit 94 and attached onto the boundary portion between the top and bottom split pixel areas 3a and 3b.

The present invention is not limited to the first to twelfth embodiments, so that the first to eleventh embodiments are expandable and/or modifiable within the scope of the present invention.

In each of the first, second, and fourth to twelfth embodiments, the first image data corresponding to the first FOV segment is combined with the second image data corresponding to the second FOV segment to obtain combined image data corresponding to the horizontally-oriented FOV.

An imaging device according to the present invention can store therein the first image data corresponding to the first FOV segment and the second image data corresponding to the second FOV segment.

As need arises, the imaging device can send, to a personal computer as an external device, the first image data and the second image data. In this modification, the personal computer can combine the first image data with the second image data, thereby obtaining combined image data corresponding to the horizontally-oriented FOV.

Specifically, in the modification, a processing unit configured to combine the first image data corresponding to the first FOV segment with the second image data corresponding to the second FOV segment can be externalized from the imaging device.

In the first embodiment, the control unit 12 uses the first and second image data in multilevel format to generate combined image data, and decodes the generated combined image data.

However, as described above, in one of the different areas of the memory 15, first and second binarized image data, which corresponds to the horizontally-oriented field of the target R contained in the horizontally-oriented FOV V and is obtained by the comparing circuit 16, have been stored.

Specifically, in a modification of the first embodiment, after the image picking-up task in step S3 of FIG. 5, in step S4, the control unit 12 uses the first and second binary image data to detect the same pixel value pattern in the first and second binary image data.

After the detecting task in step S4, the control unit 12 identifies the position (each address) of the same pixel value pattern in each of the first and second binary image data, thereby identifying the positional relationship between the first and second image data in binary format in step S5.

Figure 27:
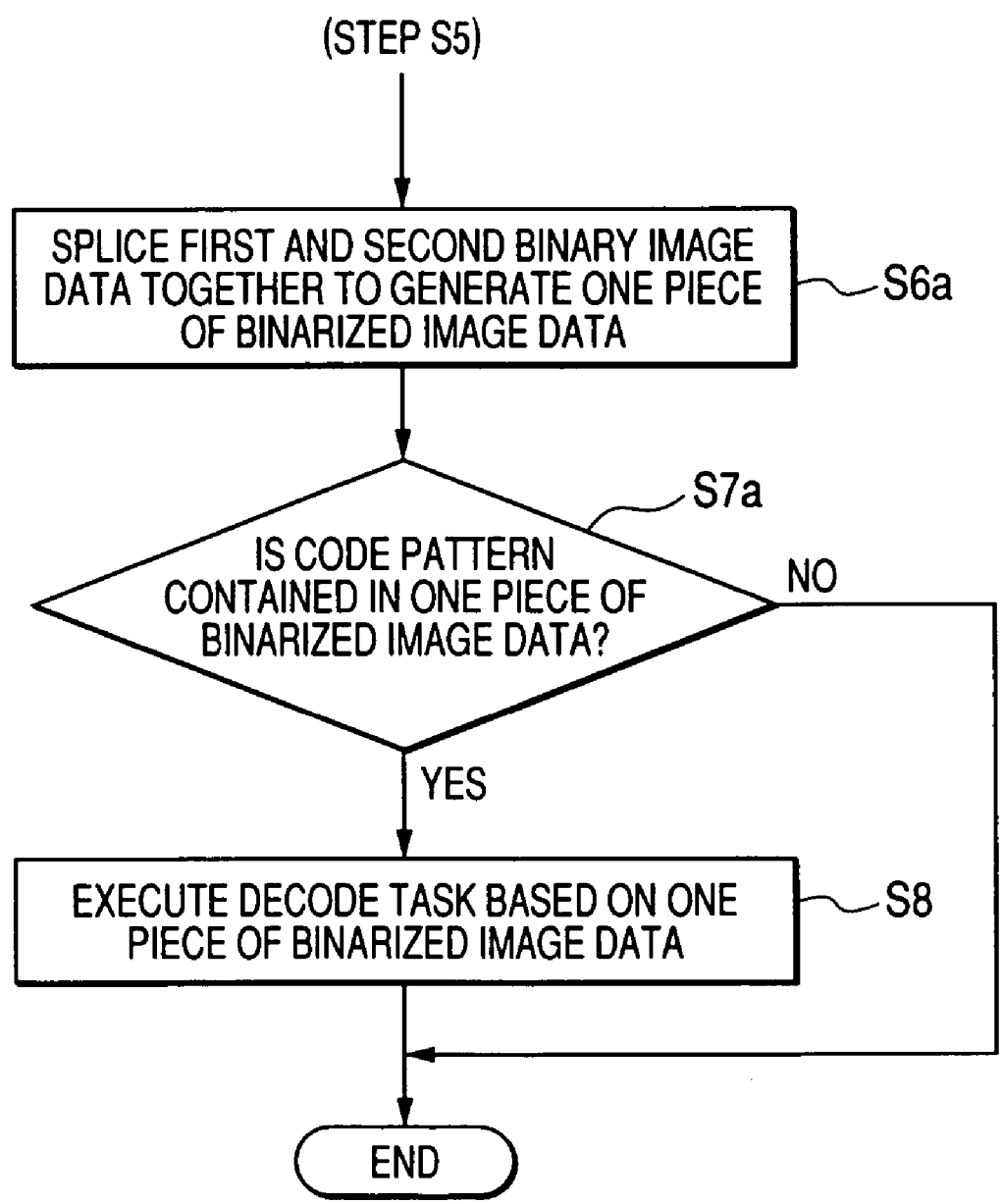
FIG. 27 is a flowchart schematically illustrating optical-information reading operations to be executed by a control unit according to a modification of the first embodiment.

Next, in step S6a of FIG. 27, the control unit 12 splices the first binary image data and the second binary image data together on the basis of the same pixel value pattern, thereby generating one piece of binarized image data corresponding to the horizontally-oriented FOV V.

In the next step S7a, the control unit 12 determines whether a code pattern corresponding at least one of optical information codes, such as barcodes, two-dimensional codes, and other types of codes is contained in the one piece of binarized image data.

If it is determined that no code patterns are contained in the combined image data (the determination in step S7a is NO), the control unit 12 exits the optical information reading tasks.

Otherwise if it is determined that a code pattern is contained in the one piece of binarized image data (the determination in step S7a is YES), the control unit 12 proceeds to step S8. In step S8, the control unit 12 executes the decoding task set forth above.

Specifically, in the decoding task in step S8, the control unit 12 according to the modification uses the one piece of the binary image data in place of the combined image data, thereby decoding the at least one of the optical information.

In each of the first to twelfth embodiment, the imaging optics for obtaining the horizontally-oriented FOV (panoramic FOV) can be modularized to be removably installed in the case of an imaging device of each of the first to eleventh embodiments. In this modification, a normal imaging optics for obtaining a normal FOV whose aspect ratio (vertical to horizontal ratio) of 3:4 can be separately prepared, which can be modularized to be removably installable in the case of the imaging device of each of the first to eleventh embodiments.

Specifically, in this modification, the modularized imaging optics and the modularized normal imaging optics can be selected to be manually or automatically installed in the case of the imaging device. This allows an FOV of the imaging device to be switched between the horizontally-oriented FOV and the normal FOV whose aspect ratio of 3:4 at user's request.

The marker beam irradiating device described in the eleventh and twelfth embodiments can be provided for each of the first to tenth embodiments. In each of the eleventh and twelfth embodiments, the marker beam irradiating device 90 is configured to irradiate a spot beam on the target R to mark the location of a reading position (picking up area) of the optical information reader, such as the center of a horizontally-oriented FOV. The marker beam irradiating device however is not limited to the structure.

Specifically, marker beam irradiating devices for irradiating a plurality of spot beams on the target R to mark a plurality of points related to a horizontally-oriented FOV, such as both lateral sides thereof, can be used in an imaging device of each of the first to eleventh embodiments. In addition, marker beam irradiating devices for irradiating, on the target R, marker beam(s) to mark various configurations related to a horizontally-oriented FOV can also be used in an imaging device of each of the first to eleventh embodiments.

In each of the first to twelfth embodiments, the light-sensitive pixel area of the photodetector 3 is divided in the vertical direction into two split pixel areas equal in size, which is preferable because the pixel area of the photodetector 3 is horizontally scanned. The present invention however is not limited to the structure.

Specifically, the number of division of the pixel area of the photodetector 3 can be adjusted. In addition, the pixel area of the photodetector 3 can be divided in the horizontal direction into two or more split pixel areas equal or different in size.

In each of the first to twelfth embodiments, as the two-dimensional photodetector 3, a color CCD area sensor is used, but other types of two-dimensional sensors, such as CMOS sensors, can be used.

In each of the first to twelfth embodiment, a plurality of FOV segments, such as first and second segments or first to third segments, can be continuously aligned, with an overlap(s), in another direction, such as the vertical direction.

For example, in the first embodiment, the first and second segments are continuously aligned, with an overlap(s), parallel to the horizontal direction LD of the reading window RW, but the present invention is not limited to the structure.

Specifically, the first and second FOV segments can be continuously aligned without overlaps in a predetermined direction, such as the horizontal direction.

In this modification, in step S4 of FIG. 5, the control unit 12 can identify boundary addresses of the top split pixel area 3a in which part of the first image data corresponding to one end of the first FOV segment in the predetermined direction is stored. In addition, the control unit 12 can identify boundary addresses of the bottom split pixel area 3b in which part of the second image data corresponding to one end of the second FOV segment in the predetermined direction is stored; this one end of the second FOV is adjacent to the one end of the first FOV segment in the predetermined direction.

Based on the identified boundary addresses of the top and bottom split pixel areas 3a and 3b, the control unit 12 can identify the positional relationship between the first and second image data in binary format or in multilevel format in step S5.

Specifically, in this modification, because the combined image data of the first and second image data is generated without executing the deleting task in step S6, it is possible to reduce the processing time of obtaining the combined image data.

In the first to twelfth embodiments, various types of imaging optics have been described, but another type of imaging optics can be used.

Figure 28:
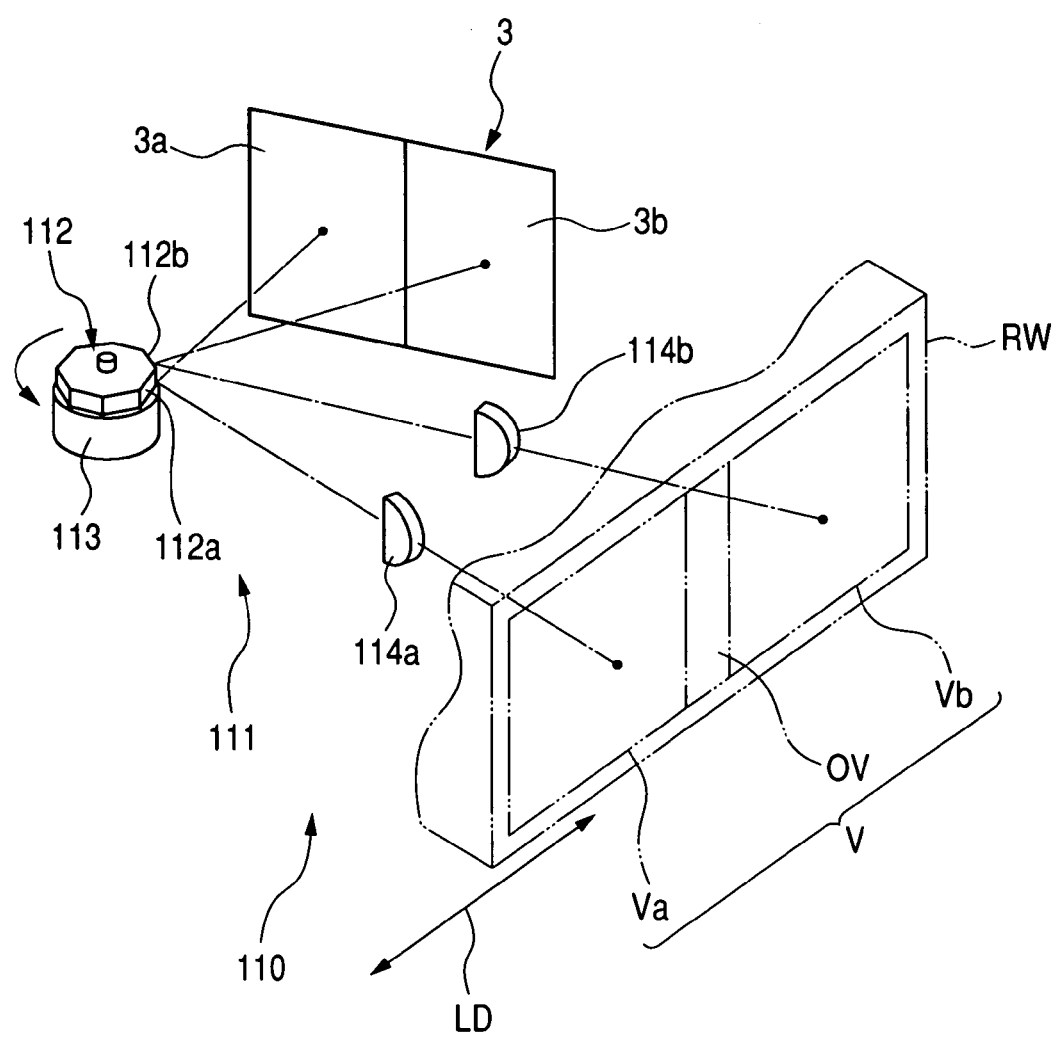
FIG. 28 is a perspective view schematically illustrating part of a reading mechanism of a two-dimensional photodetector according to a first modification of the first embodiment.

For example, FIG. 28 schematically illustrates part of a reading mechanism 110 of an optical information reader according to a first modification of the first embodiment.

The reading mechanism 110 has a structure substantially identical to that of the reading mechanism 2 except for the structure of an imaging optics 111. For this reason, except for the structure of the imaging optics 111, like reference characters are assigned to like parts in the optical information readers according to the first embodiment and the first modification so that descriptions of the parts of the optical information reader according to the first modification will be omitted or simplified.

The imaging optics 111 consists of a polygon mirror 112 and a rotary drive mechanism 113 mechanically linked thereto and electrically connected to the control unit 12. The polygon mirror 112 is an equilateral polygon prism having a plurality of reflecting surfaces (mirrors), and is made of, for example, translucent glass or plastic.

Under control of the control unit 12, the rotary drive mechanism 113 allows the polygon mirror 112 to rotate about a rotation axis orthogonal to the horizontal direction LD of the reading window RW. The polygon mirror 112 is arranged such that the reflecting surfaces face the boundary portion between the top split pixel area 3a and the bottom split pixel area 3b of the photodetector 3.

The imaging optics 111 also consists of a pair of first and second imaging lenses 114a and 114b arranged between the polygon mirror 112 and the reading window RW.

A predetermined rotating position of the polygon mirror 112 allows a first FOV Va of the top split pixel area 3a through one reflecting surface 112a and a second FOV segment Vb of the bottom split pixel area 3b through another one reflecting surface 112b are:

defined outward through the reading window RW toward the target R when the optical information reader is located such that the reading window RW is closely opposite to the target R; and continuously aligned, with an overlap OV, on the target R parallel to the horizontal direction LD of the reading window RW (see FIG. 28).

Specifically, the predetermined rotating position of the polygon mirror 112 and the first imaging lens 114a allow the one reflecting surface 112a to reflect and three-dimensionally fold light toward the top split pixel area 3a of the photodetector 3; this light is reflected from the first FOV segment Va onto the one reflecting surface 112a.

Similarly, the predetermined rotating position of the polygon mirror 112 and the second imaging lens 114b allow another one reflecting surface 112b to reflect and three-dimensionally fold light toward the bottom split pixel area 3b of the photodetector 3; this light is reflected from the second FOV segment Vb onto another one reflecting surface 112b.

Figure 29:
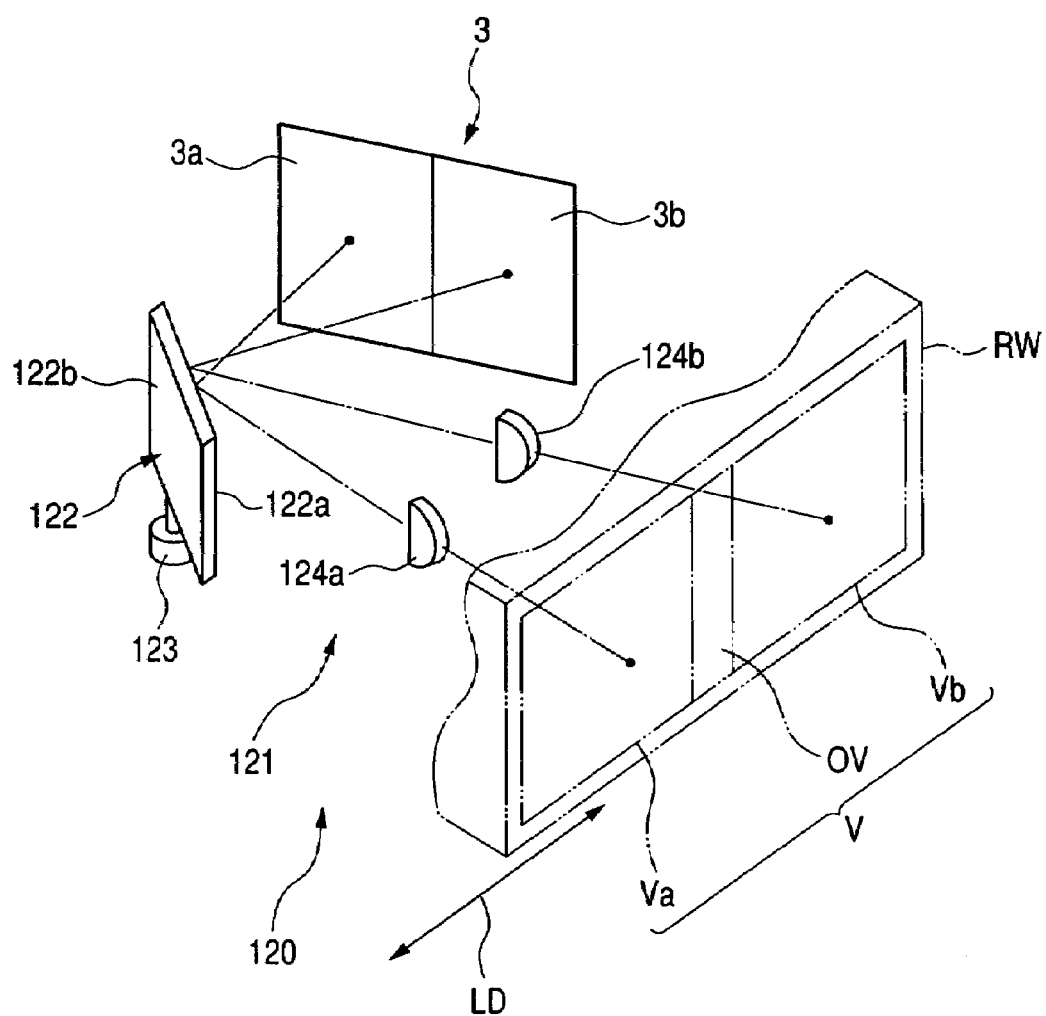
FIG. 29 is a perspective view schematically illustrating part of a reading mechanism of a two-dimensional photodetector according to a second modification of the first embodiment.

In addition, FIG. 29 schematically illustrates part of a reading mechanism 120 of an optical information reader according to a second modification of the first embodiment.

The reading mechanism 120 has a structure substantially identical to that of the reading mechanism 2 except for the structure of an imaging optics 121. For this reason, except for the structure of the imaging optics 121, like reference characters are assigned to like parts in the optical information readers according to the first embodiment and the second modification so that descriptions of the parts of the optical information reader according to the second modification will be omitted or simplified.

The imaging optics 121 consists of a plate mirror 122 and a rotary drive mechanism 123 mechanically linked thereto and electrically connected to the control unit 12. The plate mirror 122 has first and second opposing reflecting surfaces, and is made of, for example, translucent glass or plastic.

Under control of the control unit 12, the rotary drive mechanism 123 allows the plate mirror 122 to rotate about a rotation axis orthogonal to the horizontal direction LD of the reading window RW. The plate mirror 122 is arranged such that one of the first and second reflecting surfaces 122a and 122b face the pixel area of the photodetector 3.

The imaging optics 121 also consists of a pair of first and second imaging lenses 124a and 124b arranged between the plate mirror 122 and the reading window RW.

A predetermined rotating position of the plate mirror 122 allows a first FOV Va of the top split pixel area 3a through part of the first reflecting surface 122a and a second FOV segment Vb of the bottom split pixel area 3b through another part of the first reflecting surface 122a are:

defined outward through the reading window RW toward the target R when the optical information reader is located such that the reading window RW is closely opposite to the target R; and continuously aligned, with an overlap OV, on the target R parallel to the horizontal direction LD of the reading window RW (see FIG. 29).

Specifically, the predetermined rotating position of the plate mirror 122 and the first imaging lens 124a allow part of the first reflecting surface 122a to reflect and three-dimensionally fold light toward the top split pixel area 3a of the photodetector 3; this light is reflected from the first FOV segment Va onto part of the first reflecting surface 122a.

Similarly, the predetermined rotating position of the plate mirror 122 and the second imaging lens 124b allow another part of the first reflecting surface 122a to reflect and three-dimensionally fold light toward the bottom split pixel area 3b of the photodetector 3; this light is reflected from the second FOV segment Vb onto another part of the first reflecting surface 122a.

Figure 30:
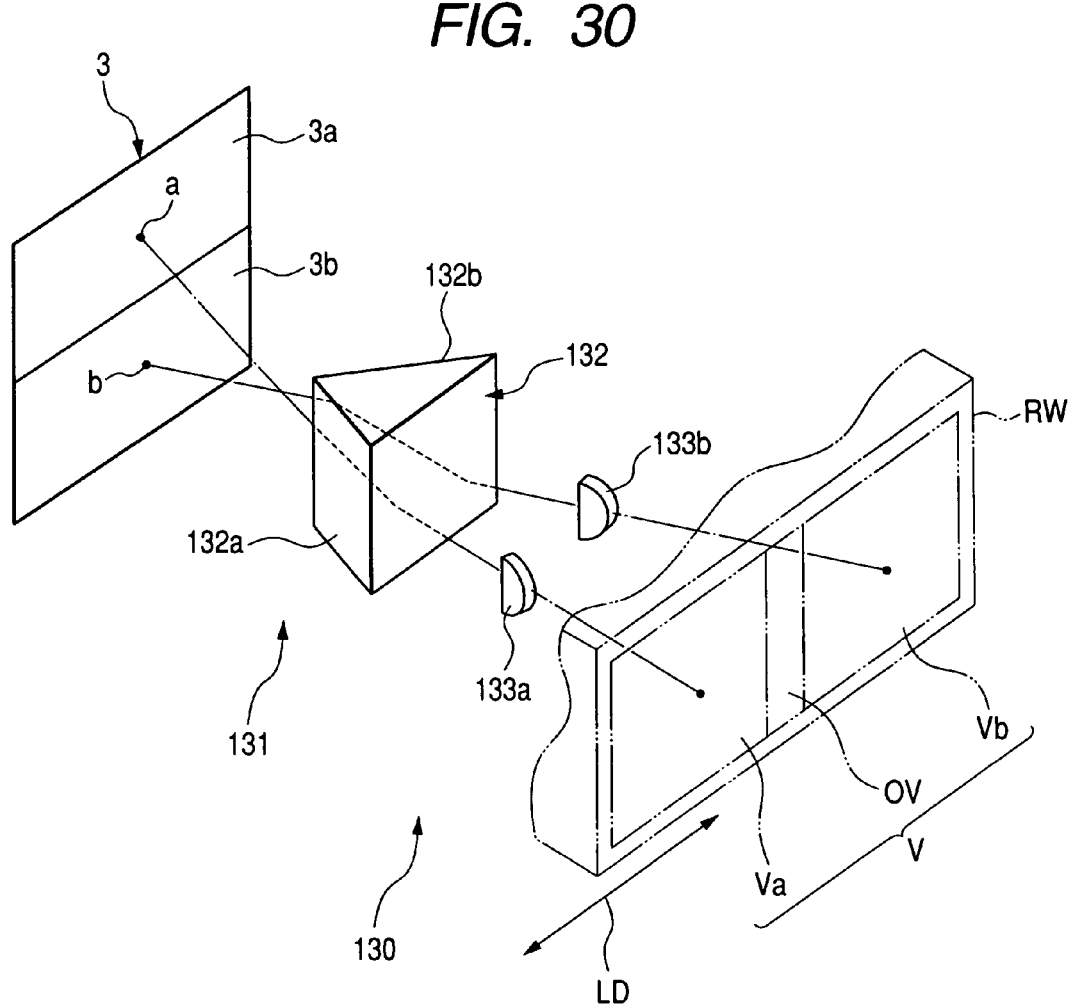
FIG. 30 is a perspective view schematically illustrating part of a reading mechanism of a two-dimensional photodetector according to a third modification of the first embodiment.

Furthermore, FIG. 30 schematically illustrates part of a reading mechanism 130 of an optical information reader according to a third modification of the first embodiment.

The reading mechanism 130 has a structure substantially identical to that of the reading mechanism 2 except for the structure of an imaging optics 131. For this reason, except for the structure of the imaging optics 131, like reference characters are assigned to like parts in the optical information readers according to the first embodiment and the third modification so that descriptions of the parts of the optical information reader according to the third modification will be omitted or simplified.

The imaging optics 131 consists of a prism 132 having a triangle or wedge bases and three rectangular sides. The prism 132 is made of, for example, translucent glass or plastic.

The prism 132 is arranged such that adjacent first and second sides 132a and 132b are opposite respectively to one-half part of the top and bottom pixel areas 3a and 3b of the photodetector 3 and to the other-half part thereof.

The imaging optics 131 also consists of a pair of first and second imaging lenses 133a and 133b arranged between the prism 132 and the reading window RW.

The prism 132 and the first and second imaging lenses 133a and 133b allow a first FOV Va of the top split pixel area 3a through the first side 132a and a second FOV segment Vb of the bottom split pixel area 3b through the second side 132b are:

defined outward through the reading window RW toward the target R when the optical information reader is located such that the reading window RW is closely opposite to the target R; and continuously aligned, with an overlap OV, on the target R parallel to the horizontal direction LD of the reading window RW (see FIG. 30).

Specifically, the prism 132 allows refraction of light so as to three-dimensionally fold the refracted light toward the top split pixel area 3a of the photodetector 3 through the first imaging lens 133a; this light is reflected from the first FOV segment Va to be entered into the prism 132 through the first side 132a.

Similarly, the prism 132 allows refraction of light so as to three-dimensionally fold the refracted light toward the bottom split pixel area 3b of the photodetector 3 through the second imaging lens 133b; this light is reflected from the second FOV segment Vb to be entered into the prism 132 through the second side 132b.

As well as each of the first to twelfth embodiments, the first and second FOV segments Va and Vb are continuously aligned, with the overlap OV, parallel to the horizontal direction LD of the reading window RW with no gap in the vertical direction orthogonal to the horizontal direction LD. For this reason, the combination of the first and second FOV segments Va and Vb provides a horizontally-oriented FOV V.

As described above, in each of the first to third modifications of the first embodiment, it is possible to easily cover, in the horizontally-oriented FOV V, horizontally-oriented items of optically readable information, such as barcodes having a relatively large length across its bars and spaces, written on the target R and having a large amount of data. This allows the horizontally-oriented items to be easily read with high resolution.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An imaging device for imaging a target, the imaging device comprising:
   a photodetector with a two-dimensional light sensitive pixel area, the two-dimensional light sensitive pixel area being divided into a plurality of split pixel areas, each of the split pixel areas being composed of a plurality of pixels; and
   an imaging optics configured to:
      define a plurality of segments of an FOV (field of view), the plurality of segments of the FOV respectively corresponding to the plurality of split pixel areas of the photodetector; and
      align, in a predetermined direction, the plurality of segments of the FOV to form a predetermined-direction oriented FOV so that the target is at least partially contained in the predetermined-direction oriented FOV,
   wherein the two-dimensional light sensitive pixel area is:
      composed of a plurality of pixels in first and second directions orthogonal to each other, charge in each pixel of the two-dimensional light sensitive pixel area being configured to be scanned in one of the first and second directions; and
      divided in the other of the first and second directions into the plurality of split pixel areas, and wherein the imaging optics is configured to align the plurality of segments of the FOV parallel to the one of the first and second directions.

2. An imaging device according to claim 1, wherein
the plurality of split pixel areas include first and second split pixel areas,
the plurality of segments of the FOV include first and second segments of the FOV respectively corresponding to the first and second split pixel areas of the photodetector, and
the imaging optics is configured to align, with an overlap, the first and second of segments of the FOV in the predetermined direction.

3. An imaging device according to claim 2, wherein
the imaging optics is configured to focus first and second light beams respectively onto the first and second split pixel areas of the photodetector, the first and second light beams being reflected from first and second parts of the target, the first and second parts of the target being contained respectively in the first and second segments of the FOV, further comprising:

a combined-image obtaining unit configured to:
- pick up first image data and second image data of the first and second parts of the target based on the first and second focused light beams onto the first and second split pixel areas of the photodetector;
- compare the first image data with the second image data to detect, based on the compared result, part of at least one of the first image data and the second image data corresponding to the overlap between the first and second segments of the FOV; and
- generate combined image data based on the first image data, the second image data, and the detected part of at least one of the first image data and the second image data.

4. An imaging device according to claim 3, wherein, when the imaging optics is configured to align, with the overlap, the first and second of segments of the FOV in the predetermined direction such that there is a deviation region in another direction with respect to the predetermined direction, the combined image data contains deviated image data of the deviation region, further comprising:

a deleting unit configured to delete the deviated image data from the combined image data.

5. An imaging device according to claim 2, wherein the target contains an item of optically readable information, the optically readable information is contained in the predetermined-direction oriented FOV, and the imaging optics is configured to focus first and second light beams respectively onto the first and second split pixel areas of the photodetector, the first and second light beams being reflected from first and second parts of the target, the first and second parts of the target being contained respectively in the first and second segments of the FOV, further comprising:

a picking-up unit configured to pick up first image data and second image data of the first and second parts of the target based on the first and second focused light beams onto the first and second split pixel areas of the photodetector;

an identifying unit configured to identify a specified pattern corresponding to the item of optically readable information based on the first image data and the second image data; and a decoding unit configured to decode the item of optically readable information based on the first image data, the second image data, and the identified specified pattern.

6. An imaging device according to claim 5, wherein the two-dimensional light sensitive pixel area is composed of a plurality of pixels in first and second directions orthogonal to each other, the first image data is first binarized image data generated by comparing an intensity level of the first light beam focused onto each pixel of the first split pixel area with a threshold level, the second image data is second binarized image data generated by comparing an intensity level of the second light beam focused onto each pixel of the second split pixel area with the threshold level, and the decoding unit is configured to:

compare the first binarized image data with the second binarized image data to detect, based on the compared result, part of at least one of the first binarized image data and the second binarized image data corresponding to the overlap between the first and second segments of the FOV;

splice the first binarized image data and the second binarized image data together based on the detected part of at least one of the first binarized image data and the second binarized image data to generate one piece of binarized image data corresponding to the predetermined-direction oriented FOV; and decode the item of optically readable information based on the one piece of binarized image data and the identified specified pattern.

7. An imaging device according to claim 5, wherein the decoding unit is configured to:

compare the first image data with the second image data to detect, based on the compared result, part of at least one of the first image data and the second image data corresponding to the overlap between the first and second segments of the FOV;

generate combined image data based on the first image data, the second image data, and the detected part of at least one of the first image data and the second image data; and decode the item of optically readable information based on the combined image data and the identified specified pattern.

8. An imaging device according to claim 2, wherein the imaging optics includes:

a first reflector arranged opposite the two-dimensional light sensitive pixel area of the photodetector and inclined with respect to a surface direction of the two-dimensional light sensitive pixel area of the photodetector and to a normal line of the two-dimensional light sensitive pixel area thereof;

a second reflector arranged opposite the two-dimensional light sensitive pixel area of the photodetector and inclined with respect to the surface direction of the two-dimensional light sensitive pixel area of the photodetector and to the normal line of the two-dimensional light sensitive pixel area thereof;

a first imaging lens arranged between the first reflector and the target; and a second imaging lens arranged between the second reflector and the target, wherein an arrangement of the first reflector and the first imaging lens allows the first reflector to reflect and fold a first light beam toward the first split pixel area of the photodetector, the first light beam being reflected from the first segment of the FOV onto the first reflector through the first imaging lens, and an arrangement of the second reflector and the second imaging lens allows the second reflector to reflect and fold a second light beam toward the second split pixel area of the photodetector, the second light beam being reflected from the second segment of the FOV onto the second reflector through the second imaging lens.

9. An imaging device according to claim 2, wherein the imaging optics includes:

a first imaging optical element located opposite the first split pixel area of the photodetector, the first imaging optical element having a first optical axis opposite the target and a second optical axis opposite the first split pixel area, the first optical axis being oriented toward the first segment of the FOV, the second optical axis being oriented toward the first split pixel area;

a second imaging optical element located opposite the second split pixel area of the photodetector and substantially aligned with the first imaging optical element in a direction orthogonal to the predetermined direction, the second imaging optical element having a third optical axis opposite the target and a fourth optical axis opposite the second split pixel area, the third optical axis being oriented toward the second segment of the FOV, the fourth optical axis being oriented toward the second split pixel area; and a partitioning member arranged to partition an optical path between the first split pixel area and the first imaging optical element and an optical path between the second split pixel area and the second imaging optics, wherein an arrangement of the first imaging optical element and the partitioning member allows the first imaging optical element to fold a first light beam toward the first split pixel area of the photodetector, the first light beam being reflected from the first segment of the FOV onto the first imaging optical element, and an arrangement of the second imaging optical element and the partitioning member allows the second imaging optical element to fold a second light beam toward the second split pixel area of the photodetector, the second light beam being reflected from the second segment of the FOV onto the second imaging optical element.

10. An imaging device according to claim 9, wherein the partitioning member is arranged to be movable between a working position and a retracting position, the partitioning member located at the working position partitioning the optical path between the first split pixel area and the first imaging optical element and the optical path between the second split pixel area and the second imaging optics, the partitioning member located at the retracting position being away from the photodetector.

11. An imaging device according to claim 10, further comprising
a drive mechanism mechanically linked to the partitioning member and configured to move the partitioning member between the working position and the retracting position.

12. An imaging device according to claim 2, wherein the imaging optics includes:
a first imaging optical element corresponding to the first split pixel area of the photodetector, the first imaging optical element having a first optical axis opposite the target and a second optical axis opposite the first split pixel area, the first optical axis being oriented toward the first segment of the FOV, the second optical axis being oriented toward the first split pixel area;
a second optical imaging element corresponding to the second split pixel area and aligned with the first optical imaging element in a direction substantially parallel to the predetermined direction, the second imaging optical element having a third optical axis opposite the target and a fourth optical axis opposite the second split pixel area, the third optical axis being oriented toward the second segment of the FOV, the fourth optical axis being oriented toward the second split pixel area;
a partitioning member arranged to partition an optical path between the first split pixel area and the first imaging optical element and an optical path between the second split pixel area and the second imaging optics, wherein
an arrangement of the first imaging optical element and the partitioning member allows the first imaging optical element to fold a first light beam toward the first split pixel area of the photodetector, the first light beam being reflected from the first segment of the FOV onto the first imaging optical element, and
an arrangement of the second imaging optical element and the partitioning member allows the second imaging optical element to fold a second light beam toward the second split pixel area of the photodetector, the second light beam being reflected from the second segment of the FOV onto the second imaging optical element.

13. An imaging device according to claim 12, wherein the partitioning member is arranged to be movable between a working position and a retracting position, the partitioning member located at the working position partitioning the optical path between the first split pixel area and the first imaging optical element and the optical path between the second split pixel area and the second imaging optics, the partitioning member located at the retracting position being away from the photodetector.

14. An imaging device according to claim 13, further comprising
a drive mechanism mechanically linked to the partitioning member and configured to move the partitioning member between the working position and the retracting position.

15. An imaging device according to claim 2, wherein the imaging optics includes:
a first imaging optical element corresponding to the first split pixel area of the photodetector, the first imaging optical element having a first optical axis opposite the target and a second optical axis opposite the first split pixel area, the first optical axis being oriented toward the first segment of the FOV, the second optical axis being oriented toward the first split pixel area;
a second optical imaging element corresponding to the second split pixel area and aligned with the first optical imaging element in a direction substantially parallel to the predetermined direction, the second imaging optical element having a third optical axis opposite the target and a fourth optical axis opposite the second split pixel area, the third optical axis being oriented toward the second segment of the FOV, the fourth optical axis being oriented toward the second split pixel area; and
a partially shielding member arranged at least one of between the two-dimensional light sensitive pixel area of the photodetector and the first and second optical imaging elements and between the target and the first and second optical imaging elements, the partially shielding member partially shielding an FOV of the first optical imaging member and an FOV of the second optical imaging member, wherein
an arrangement of the first imaging optical element and the partially shielding member allows part of a first light beam to be shielded and the remaining first light beam to be oriented toward the first split pixel area of the photodetector, the first light beam being reflected from the first segment of the FOV toward the first imaging optical element, and
an arrangement of the second imaging optical element and the partially shielding member allows part of a second light beam to be shielded and the remaining second light beam to be oriented toward the second split pixel area of the photodetector, the second light beam being reflected from the first segment of the FOV toward the second imaging optical element.

16. An imaging device according to claim 15, wherein the partially shielding member is arranged to be movable between a working position and a retracting position, the partially shielding member located at the working position partially shielding the FOV of the first optical imaging member and the FOV of the second optical imaging member, the partitioning member located at the retracting position being away from the photodetector.

17. An imaging device according to claim 16, further comprising
a drive mechanism mechanically linked to the partially shielding member and configured to move the partially shielding member between the working position and the retracting position.

18. An imaging device according to claim 2, wherein
the imaging optics includes:
a first imaging optical element located opposite the two-dimensional light sensitive pixel area of the photodetector, the first imaging optical element having a first optical axis opposite the target and a second optical axis opposite the first split pixel area, the first optical axis being oriented toward the first segment of the FOV, the second optical axis being oriented toward the first split pixel area; and
a second imaging optical element located opposite the two-dimensional light sensitive pixel area of the photodetector, the second imaging optical element having a third optical axis opposite the target and a fourth optical axis opposite the second split pixel area, the third optical axis being oriented toward the second segment of the FOV, the fourth optical axis being oriented toward the second split pixel area, wherein
the first imaging optics and the second imaging optic are formed in one piece of plastic to form a lens unit.

19. An imaging device according to claim 18, wherein
the lens unit includes a frame configured to intermediate between the first and second imaging optics to integrally support the first and second imaging optics, and the imaging optics further includes a light shielding cover configured to cover the frame.

20. An imaging device according to claim 19, wherein
the lens unit and the light shielding cover are formed in one piece using coinjection molding.

21. An imaging device according to claim 2, further comprising:
a marker beam irradiating unit having an optical element and arranged toward the target, the marker beam irradiating unit being configured to emit a marker beam so that the emitted marker beam is collected by the optical element to be irradiated onto the target, wherein the optical element, the first imaging optics, and the second imaging optic are formed in one piece of plastic to form the lens unit.

22. An imaging device for imaging a target, the imaging device comprising:
a photodetector with a two-dimensional light sensitive pixel area, the two-dimensional light sensitive pixel area being divided into a plurality of split pixel areas, each of the split pixel areas being composed of a plurality of pixels; and
an imaging optics configured to:
define a plurality of segments of an FOV (field of view), the plurality of segments of the FOV respectively corresponding to the plurality of split pixel areas of the photodetector; and
align, in a predetermined direction, the plurality of segments of the FOV to form a predetermined-direction oriented FOV so that the target is at least partially contained in the predetermined-direction oriented FOV,
wherein the two-dimensional light sensitive pixel area is composed of a plurality of pixels in first and second directions orthogonal to each other, charge in each pixel of the two-dimensional light sensitive pixel area being configured to be scanned in one of the first and second directions, and the two-dimensional light sensitive pixel area has a vertical to horizontal ratio of 3:4.

* * * * *